United States Patent
Ruan et al.

(10) Patent No.: US 9,727,407 B2
(45) Date of Patent: *Aug. 8, 2017

(54) LOG ANALYTICS FOR PROBLEM DIAGNOSIS

(71) Applicant: International Business Machines Corporation, Armonk, NY (US)

(72) Inventors: Yaoping Ruan, White Plains, NY (US); Byungchul Tak, Peekskill, NY (US); Shu Tao, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,288

(22) Filed: Nov. 27, 2015

(65) Prior Publication Data
US 2016/0124793 A1    May 5, 2016

Related U.S. Application Data

(63) Continuation of application No. 14/867,656, filed on Sep. 28, 2015.

(60) Provisional application No. 62/073,443, filed on Oct. 31, 2014.

(51) Int. Cl.
G06F 11/07 (2006.01)
G06F 11/22 (2006.01)
G06N 5/04 (2006.01)

(52) U.S. Cl.
CPC ........ *G06F 11/079* (2013.01); *G06F 11/0709* (2013.01); *G06F 11/2257* (2013.01); *G06N 5/045* (2013.01)

(58) Field of Classification Search
CPC . G06F 11/079; G06F 11/0709; G06F 11/2257
See application file for complete search history.

(56) References Cited

U.S. PATENT DOCUMENTS

| | | | | |
|---|---|---|---|---|
| 9,208,193 B1* | 12/2015 | Gulasky | ............ | G06F 17/30377 |
| 2003/0110398 A1* | 6/2003 | Dacier | ................ | G06F 11/0709 726/4 |
| 2010/0241903 A1* | 9/2010 | Goldszmidt | ........ | G06F 11/0709 714/38.14 |

(Continued)

OTHER PUBLICATIONS

Ting Wang et al, A Temporal Data-Mining Approach for Discovering End-to-End Transaction Flows. 2008 IEEE International Conference on Web Services, 2008. pp. 37-44.

(Continued)

*Primary Examiner* — Yolanda L Wilson
(74) *Attorney, Agent, or Firm* — Louis J. Percello; Otterstedt, Ellenbogen & Kammer, LLP

(57) ABSTRACT

In a set of problem log entries from a computing system, a subset of the set of problem log entries are identified, which pertain to a failed request. The subset is compared to a reference model which defines log entries per request type under a healthy state of the computing system, to identify a portion of the subset of problem log entries which deviate from corresponding log entries in the reference model. In the portion of the subset, at least one high-value log entry is identified. The at least one high-value log entry is output.

8 Claims, 21 Drawing Sheets

(56) References Cited

U.S. PATENT DOCUMENTS

| | | | | |
|---|---|---|---|---|
| 2011/0252420 | A1* | 10/2011 | Tung | G06F 9/5072 718/1 |
| 2014/0006844 | A1* | 1/2014 | Alderman | G06F 11/0793 714/4.1 |
| 2014/0068326 | A1* | 3/2014 | Quinn | G06F 11/0709 714/15 |

OTHER PUBLICATIONS

Ding Yuan et al, Improving Software Diagnosability via Log Enhancement. ASPLOS'11 Mar. 5-11, 2011. pp. 3-14.

Andrew Whitaker et al, Configuration Debugging as Search: Finding the Needle in the Haystack. Proceeding OSDI'04 Proceedings of the 6th conference on Symposium on Opearting Systems Design & Implementation—vol. 6. pp. 6-20.

Josiah Dykstra et al, Design and implementation of FROST: Digital forensic tools for the OpenStack cloud computing platform. Digital Investigation 10, 2013. pp. S87-S95.

Theophilus Benson et al, A First Look at Problems in the Cloud. Proceeding of HotCloud'10 Boston, MA: USENIX, pp. 1-7.

Ding Yuan et al, Be Conservative: Enhancing Failure Diagnosis with Proactive Logging. Proceeding OSDI'12 Proceedings of the 10th USENIX conference on Operating Systems Design and Implementation pp. 293-306.

Bikash Sharma et al, CloudPD: Problem Determination and Diagnosis in Shared Dynamic Clouds. Dependable Systems and Networks (DSN), 2013 43rd Annual IEEE/IFIP International Conference on Date Jun. 24-27, 2013. pp. 1-12.

Adam Oliner et al, What Supercomputers Say: A Study of Five System Logs. Dependable Systems and Networks, 2007. DSN '07. 37th Annual IEEE/IFIP International Conference on Date Jun. 25-28, 2007. pp. 575-584.

Shams Zawoad et al, SecLaaS: Secure Logging-as-a-Service for Cloud Forensics. Proceeding ASIA CCS '13 Proceedings of the 8th ACM SIGSAC symposium on Information, computer and communications security. pp. 219-230.

Jianwen Wei et al, Analysis Farm: A Cloud-based Scalable Aggregation and Query Platform for Network Log Analysis. 2011 International Conference on Cloud and Service Computing, 2011 IEEE. pp. 354-359.

Marcos K. Aguilera et al, Performance Debugging for Distributed Systems of Black Boxes. Proceeding SOSP '03 Proceedings of the nineteenth ACM symposium on Operating systems principles. pp. 74-89.

Mona Attariyan et al, Automating configuration troubleshooting with dynamic information flow analysis. Proceeding OSDI'10 Proceedings of the 9th USENIX conference on Operating systems design and implementation Article No. 1-11, pp. 1-14.

Weihang Jiang et al, Understanding Customer Problem Troubleshooting from Storage System Logs. 7th USENIX Conference on File and Storage Technologies. pp. 43-56.

Yi-Min Wang et al, STRIDER: A Black-box, State-based Approach to Change and Configuration Management and Support. 2003 LISA XVII—Oct. 26-31, 2003. pp. 165-178.

Salman A Baset et al, Towards Achieving Operational Excellence in a Cloud. IBM Journal of Research and Development, 2014. pp. 4:1-4:11.

James E. Prewett, Analyzing cluster log files using Logsurfer. In Annual Conference on Linux Clusters, 2003. pp. 1-12.

Zuoning Yin et al, An Empirical Study on Configuration Errors in Commercial and Open Source Systems. SOSP '11, Oct. 23-26, 2011, pp. 159-172.

Risto Vaarandi, Mining Event Logs with SLCT and LogHound. Network Operations and Management Symposium, 2008. NOMS 2008, IEEE. pp. 1071-1074.

Pin Zhou et al, GAUL: Gestalt Analysis of Unstructured Logs for Diagnosing Recurring Problems in Large Enterprise Storage Systems. 2010 29th IEEE International Symposium on Reliable Distributed Systems. pp. 148-159.

Ding Yuan et al, SherLog: Error Diagnosis by Connecting Clues from Run-time Logs. ASPLOS'10, Mar. 13-17, 2010. pp. 1-12.

Qiang Fu et al, Execution Anomaly Detection in Distributed Systems through Unstructured Log Analysis. Data Mining, 2009. ICDM '09. Ninth IEEE International Conference on Dec. 6-9, 2009. pp. 149-158.

Hui Kang et al, DAPA: Diagnosing Application Performance Anomalies for Virtualized Infrastructures. Proceedings of the 2nd USENIX conference, 2012. pp. 1-6.

Chun Yuan et al, Automated Known Problem Diagnosis with Event Traces. EuroSys'06, Apr. 18-21, 2006. pp. 375-388.

Kathleen Fisher et al, From Dirt to Shovels: Fully Automatic Tool Generation from Ad Hoc Data. Proceeding POPL '08 Proceedings of the 35th annual ACM SIGPLAN-SIGACT symposium on Principles of programming languages. pp. 421-434.

Ariel Rabkin et al, Precomputing Possible Configuration Error Diagnoses. Automated Software Engineering (ASE), 2011 26th IEEE/ACM International Conference on Nov. 6-10, 2011. pp. 193-202.

Sivan Sabato et al, Analyzing System Logs: A New View of What's Important. Proceeding SYSML'07 Proceedings of the 2nd USENIX workshop on Tackling computer systems problems with machine learning techniques. pp. 1-7.

Wei Xu et al, Detecting Large-Scale System Problems by Mining Console Logs. Proceeding SOSP '09 Proceedings of the ACM SIGOPS 22nd symposium on Operating systems principles pp. 117-132.

Rsyslog, downloaded from http://en.wikipedia.org/wiki/Rsyslog on Oct. 30, 2014.

The NIST Definition of Cloud Computing, Special Publication 800-145, Sep. 2011. pp. 1-7.

Yaoping Ruan et al., unpublished U.S. Appl. No. 14/867,656, filed Sep. 28, 2015, "Log Analytics for Problem Diagnosis," pp. 1-45 plus 21 sheets drawings.

List of IBM Patents or Applications Treated as Related.

* cited by examiner

| Algoritm 1 Pseudo-code for Log Correlation Rule Generation |
|---|

Input: Log file $F$ over sufficiently long time span, Initial string pattern *ptrn* for extracting ID value from logs.
Output: Set of ID names, $R_i$ , to be used as correlation rule, where $i$ is round number.

```
 1: n ← 1                                      ▷ n is the round number
 2: Rₙ.AddRule(ptrn)              ▷ Round 1 has only one ID name.
 3. bool isRuleAdded ← True
 4: /* Collect all ID with pattern ptrn */
 5: for each logline l in F do
 6:     V.add(Match(ptrn,l).getIDvalue())      ▷ V: set of IDs
 7: end for
 8: /* Create correlated log set using V */
 9: for each logline l in F do
10:     for each v in V do
11:         if l.contains(v) then
12:             A[v].append(l)         ▷ A[v]: log set correlated to v
13:         end if
14:     end for
15:     if l is not appended then
16:         B.appended(l)                    ▷ B: uncorrelated logs
17:     end if
18: end for
19: while (is RuleAdded==True) do
20:     isRuleAdded ← False
21:     V, W ← empty set
22:     n++
23:     for each key V in A do
24:         V.add(Extract_ID_Value_From_Logset(A[v])
25:         W.add(Extract_ID_name_From_Logset(A[v])
26:     end for
```

FIG.7A

```
27:    for each v in V do
28:        c ← Count_Containing_logset(v,A)
29:        if c > 1 then
30:            k ← Find_ID_Name(v,W)
31:            Rn.RemoveRule(k)
32:        else                                      ▷ c must equal to 1
33:            k ← Find_ID_Name(v,W)
34:            Rn.AddRule(k)
35:            isRuleAdded ← True
36:        end if
37:    end for
38:    /* Update correlated, uncorrelated log sets */
39:    for each key v in A do
40:        for each logine l in A do
41:            if l contains any r in R_n then
42:                S.Add(Parse_ID(l,r))              ▷ S: set of ID
43:            end if
44:        end for
45:        for each logine l in B do
46:            if l contains any s in S then
47:                A[v].append(l)
48:                B.remove(l)
49:            end if
50:        end for
51:    end for
52: end while
```

FIG.7B

| Algoritm 2 Pseudo-code for Log Correlation |
| --- |
| Input: Log file $F$ collected from all components, Correlation Rule set $R$, Initial ID value $u$ of specific request.<br>Output: Correlated Log Set $A$.<br> 1: $n \leftarrow 1$, $A \leftarrow [\,]$                       ▷ Assign empty list to $A$<br> 2: $B \leftarrow F$          ▷ All logs are uncorrelated at the beginning.<br> 3. for each logline $l$ in $B$ do<br> 4:     if $l$ contains $u$ then<br> 5:         $A$.append($l$), $B$.remove($l$)<br> 6:     end if<br> 7: end for<br> 8: $n$++<br> 9: while $n \leq R$.number_of_rounds do<br>10:     for each logline $l$ in $A$ do<br>11:         if $l$ contains any $r$ in $R\_n$ then<br>12:             $S$.add(Parse_ID($l,r$))<br>13:         end if<br>14:     end for<br>15:     for each logine $l$ in $B$ do<br>16:         if $l$ contains any $s$ in $S$ then<br>17:             $A$.append($l$), $B$.remove($l$)<br>18:         end if<br>19:     end for<br>20:     $n$++<br>21: end while |

FIG.8

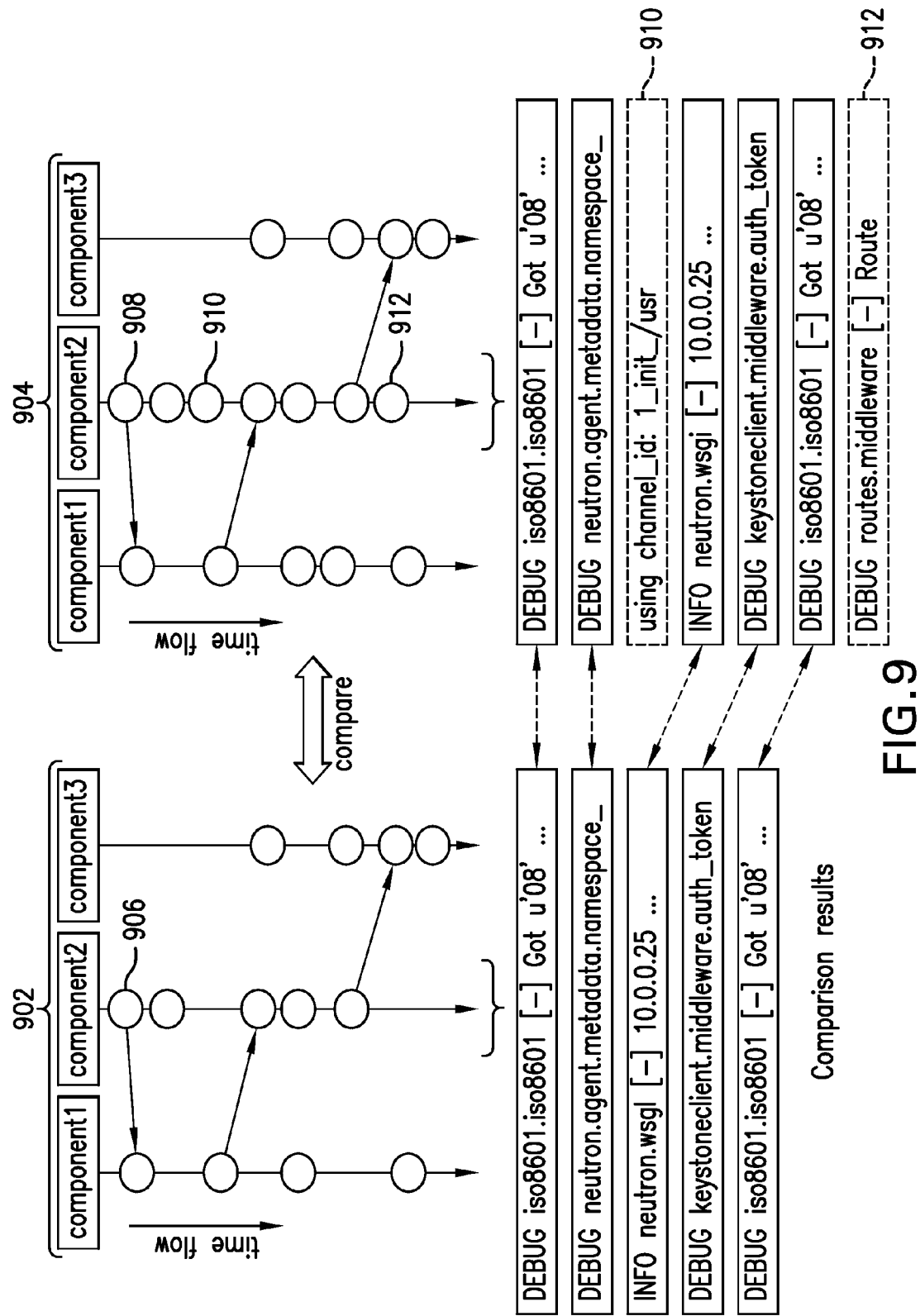

Algoritm 3 Pseudo-code for Log comparison

Input: Two log sets $L$, and $R$
Output: Aligned log sets $L$, and $R$
 1: while $L.length>0$ and $R.length>0$ do
 2:     $n, m \leftarrow 0$                    ▷ $n,m$: current index in log set $L,R$
 3:     /* Iterate left side */
 4:     $s = 0.0$                              ▷ $s$: similarity score
 5:     for $i$ from $n$ to lastindex $(L)$ do
 6:         if $L[i].templateID == R[m].templateID$ then
 7:             $s \leftarrow 1.0$
 8:         end if
 9:         if $s > max\_s$ then
10:             $max\_s \leftarrow s, max_l \leftarrow i$    ▷ $max_l$: current max
11:         end if
12:     end for
13:     $s = 0.0$                              ▷ $s$: similarity score
14:     for $i$ from $m$ to lastindex $(R)$ do
15:         if $R[i].templateID == L[n].templateID$ then
16:             $s \leftarrow 1.0$
17:         end if
18:         if $s > max\_s$ then
19:             $max\_s \leftarrow s, max_r \leftarrow i$    ▷ $max_r$: current max
20:         end if
21:     end for
22:     /* Insert blank log line */
23:     if $max_l - n \geq max_r - m$ then
24:         InsertBlankLog($R, max_l - n$)    ▷ Note that blank log is added to the opposite side. $max_l - n$ is the number of blank logs to insert
25:         $n \leftarrow max_l + 1$            ▷ Update current index for $L$
26:         $m++$                              ▷ Update current index for $R$
27:     else if $max_l - n < max_r - m$ then
28:         InsertBlankLog($L, max_r - m$)
29:         $m \leftarrow max_r + 1$
30:         $n++$
31:     end if
32: end while

FIG.10

| Method | Code Snippets | Templates |
|---|---|---|
| Source code parsing | LOG.debug(_("Going to start instances")) | Going to start instances |
| | LOG.audit(_("Associate address %(public_ip)s to instance "%(instance_id)s"), {'public_ip': public_ip, 'instance_id': instance_id}, context=context) | Associate address (.*) to instance (.*) |
| | msg = _('multiple fixed_ips exist, using the first: %s')<br>LOG.warning (msg, fixed_ips [0]) | Multiple fixed_ips exist, using the first: (.*) |

FIG.11

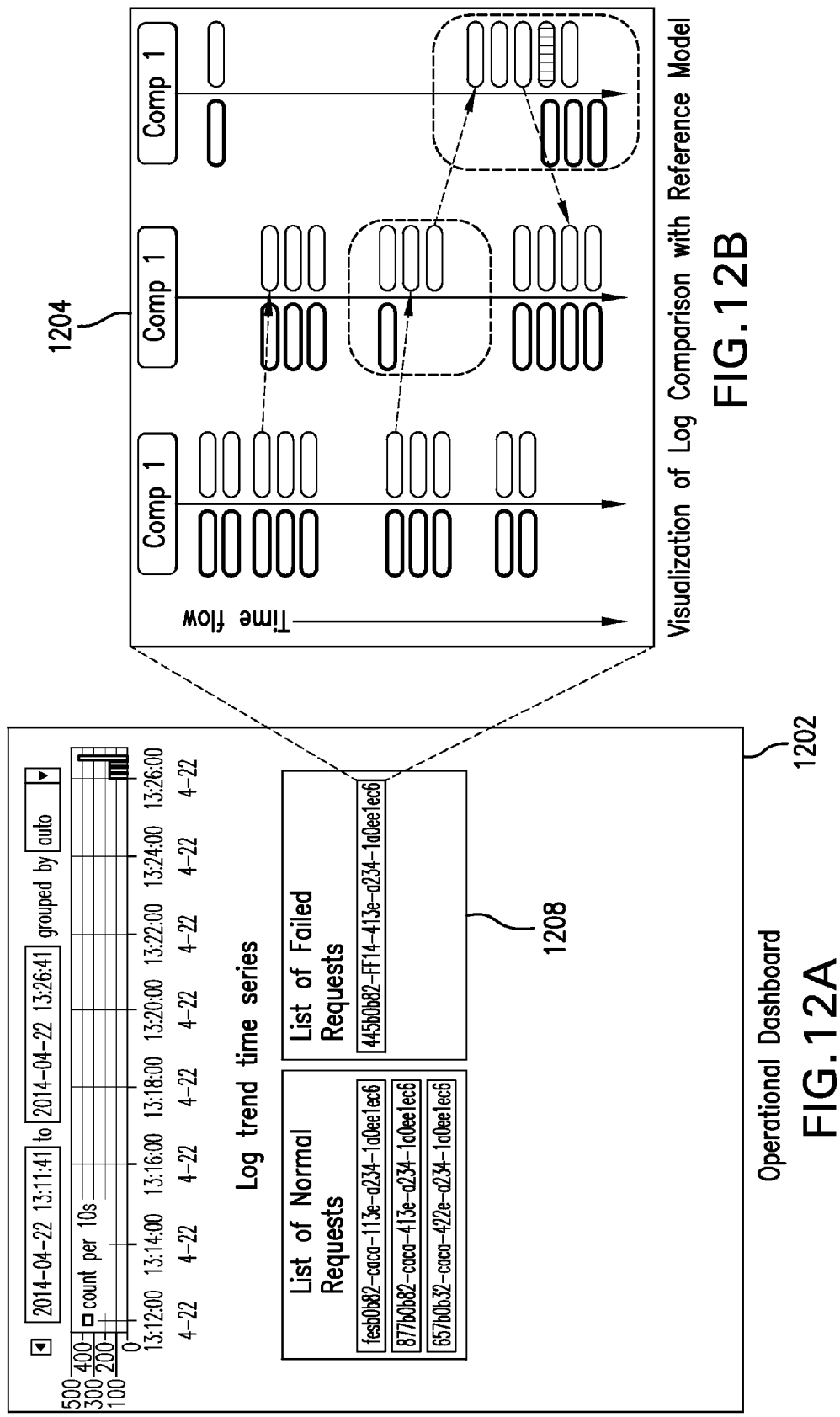

Error: Failed to launch instance "instance001": Please try again later [Error: No valid host was found.].

FIG.14

WARNING nova.scheduler.driver [req-47e13945-a606-49be-b652-ee313e4b976 admin demo] [instance: 411687b3-e44b-41c4-aaf4-12b714efe01] Setting instance to ERROR state.

FIG.15

DEBUG nova.scheduler.filters.ram_filter [req-47e13945-a606-49be-b652-ee313e4b9765 admin demo] (ubuntu, ubuntu) ram: 3378 disk:2048 io_ops:0 instances:1 does not have 8192 MB usable ram, it only has 5355.0 MB usable ram. host_passes /opt/stack/nova/nova/scheduler/filters/ram_filter.py:60

FIG.16

Error: Failed to launch instance "instance001": Please try again later [Error: No valid host was found.].

| Template | Log Text |
|---|---|
| 3 | DEBUG nova.openstack.common.rpc.amqp [req-12daf0d7-e8d3-420b-87c1-ce3e968c84dc admin demo] UNIQUE_ID is db716755da204fc8b30f6eb86890fe1a. _add_unique_id/opt/stack/nova/nova/openstack/common/rpc/amqp.py:341 |
| 154 (2101) | ERROR nova.compute.manager [req-12daf0d7-e8d3-420b-87c1-ce3e968c84dc admin demo][instance: a01a6fe1-06ef-4530-97b3-50e6a70c11cc] Error: internal error no supported architecture for os type 'hvm' #0122014-10-28 20:13:27.491 4102 TRACE nova.compute.manager [instance: a01a6fe1-06ef-4530-97b3-50e6a70c11cc] Traceback (most recent call last):#0122014-10-28 20:13:27.491 4102 TRACE nova.compute.manager [instance: a01a6fe1-06ef-4530-97b3-50e6a70c11cc]   File "/opt/stack/nova/nova/compute/manager.py", line 1043, in _build_instance#0122014-10-28 20:13:27.491 4102 TRACE nova.compute.manager [instance: a01a6fe1-06ef-4530-97b3-50e6a70c11cc]     set_access_ip=set_access_ip)#0122014-10-28 20:13:27.491 4102 TRACE nova.compute.manager [instance: a01a6fe1-06ef-4530-97b3-50e6a70c11cc]   File "/opt/stack/nova/nova/compute/manager.by", line 1413, in _spawn#0122014-10-28 20:13:27.491 4102 TRACE nova.compute.manager [instance: a01a6fe1-06ef-4530-97b3-50e6a70c11cc]     LOG.EXCEPTION(_('Instance failed to spawn'), instance=instance)#0122014-10-28 20:13:27.491 4102 TRACE nova.compute.manager [instance: a01a6fe1-06ef-4530-97b3-50e6a70c11cc]   File "/opt/stack/nova/nova/compute/manager.py", line 1410, in _spawn#0122014-10-28 20:13:27.491 4102 TRACE nova.compute.manager [instance: a01a6fe1-06ef-4530-97b3-50e6a70c11cc] block_device_info)#0122014-10-28 20:13:27.491 4102 TRACE nova.compute.manager [instance: a01a6fe1-06ef-4530-97b3-50e6a70c11cc]   File "/opt/stack/nova/nova/virt/libvirt/driver.py", line 2108, in spawn#0122014-10-28 20:13:27.491 4102 TRACE nova.compute.manager [instance: a01a6fe1-06ef-4530-97b3-50e6a70c11cc]     block_device_info, context=context)#0122014-10-28 20:13:27.491 4102 TRACE nova.compute.manager [instance: a01a6fe1-06ef-4530-97b3-50e6a70c11cc]   File "/opt/stack/nova/nova/virt/libvirt/driver.py", line 3300, in _create_domain_and_network#0122014-10-28 20:13:27.491 4102 TRACE nova.compute.manager [instance: a01a6fe1-06ef-4530-97b3-50e6a70c11cc]     domain=self._create_domain(xml, insta |
| 43 | DEBUG nova.openstack.common.rpc.amqp [req-12daf0d7-e8d3-420b-87c1-ce3e968c84dc admin demo] Sending compute.instance.create.error on notifications.error notify/opt/stack/nova/nova/openstack/common/rpc/amqp.py:621 |

LOG ANALYTICS FOR PROBLEM DIAGNOSIS

CROSS-REFERENCE TO RELATED APPLICATIONS

This application is a continuation of U.S. patent application Ser. No. 14/867,656 filed Sep. 28, 2015, the complete disclosure of which is expressly incorporated herein by reference in its entirety for all purposes, which application in turn claims the benefit of U.S. Provisional Application Ser. No. 62/073,443 filed 31 Oct. 2014, entitled LOG ANALYTICS FOR PROBLEM DIAGNOSIS, the complete disclosure of which is also expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to problem diagnosis in cloud computing environments and other modern computing environments, and the like.

BACKGROUND OF THE INVENTION

Fast growth of the cloud platform's scale and complexity calls for more sophisticated operation management. Problem diagnosis is one pertinent aspect in the domain of cloud operation management. However, operational log analysis for problem diagnosis is becoming more challenging. On the one hand, the volume of logs generated on a daily basis is overwhelmingly large, while on the other hand, with the increasing number of service components, the cross-component interactions of a cloud platform become more complex.

SUMMARY OF THE INVENTION

Principles of the invention provide techniques for log analytics for problem diagnosis. In one aspect, an exemplary method includes identifying, in a set of problem log entries from a computing system, a subset of the set of problem log entries which pertain to a failed request; comparing the subset to a reference model which defines log entries per request type under a healthy state of the computing system, to identify a portion of the subset of problem log entries which deviate from corresponding log entries in the reference model; identifying, in the portion of the subset, at least one high-value log entry; and outputting the at least one high-value log entry.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one, some, or all of the following:

allows humans to quickly grasp what the distributed execution patterns are like in terms of log entries, by automatically processing a large number of logs;
 automatically builds the reference execution pattern that represents the correct execution by processing a large amount of logs;
 allows humans to quickly identify how the problematic execution differs from the reference execution pattern; and
 reduces or eliminates need for human to find clues as to what the root cause of the problem is by determining and highlighting the most relevant log entries that may contain the key information.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 7A and 7B depict pseudo-code for log correlation rule generation, according to an embodiment of the present invention;

FIG. 8 depicts pseudo-code for log correlation, according to an embodiment of the present invention;

FIG. 9 depicts an exemplary overview of a log comparison task, according to an embodiment of the present invention;

FIG. 10 depicts pseudo-code for log comparison, according to an embodiment of the present invention;

FIG. 11 illustrates log template generation through source code parsing, according to an embodiment of the present invention;

FIGS. 12A and 12B depict problem diagnosis using a tool set according to an embodiment of the present invention, including an operational dashboard in FIG. 12A, and a visualization of log comparison with a reference model in FIG. 12B;

FIG. 14 shows a corresponding error message;

FIG. 15 shows corresponding log content;

FIG. 16 shows a pertinent log entry, identified in an experiment using an embodiment of the present invention;

FIG. 20 shows an error message similar to that obtained in FIG. 14; and

FIG. 21 shows hints to the root cause of the problem in the log text, according to an embodiment of the present invention.

DETAILED DESCRIPTION OF PREFERRED EMBODIMENTS

Figure 1:
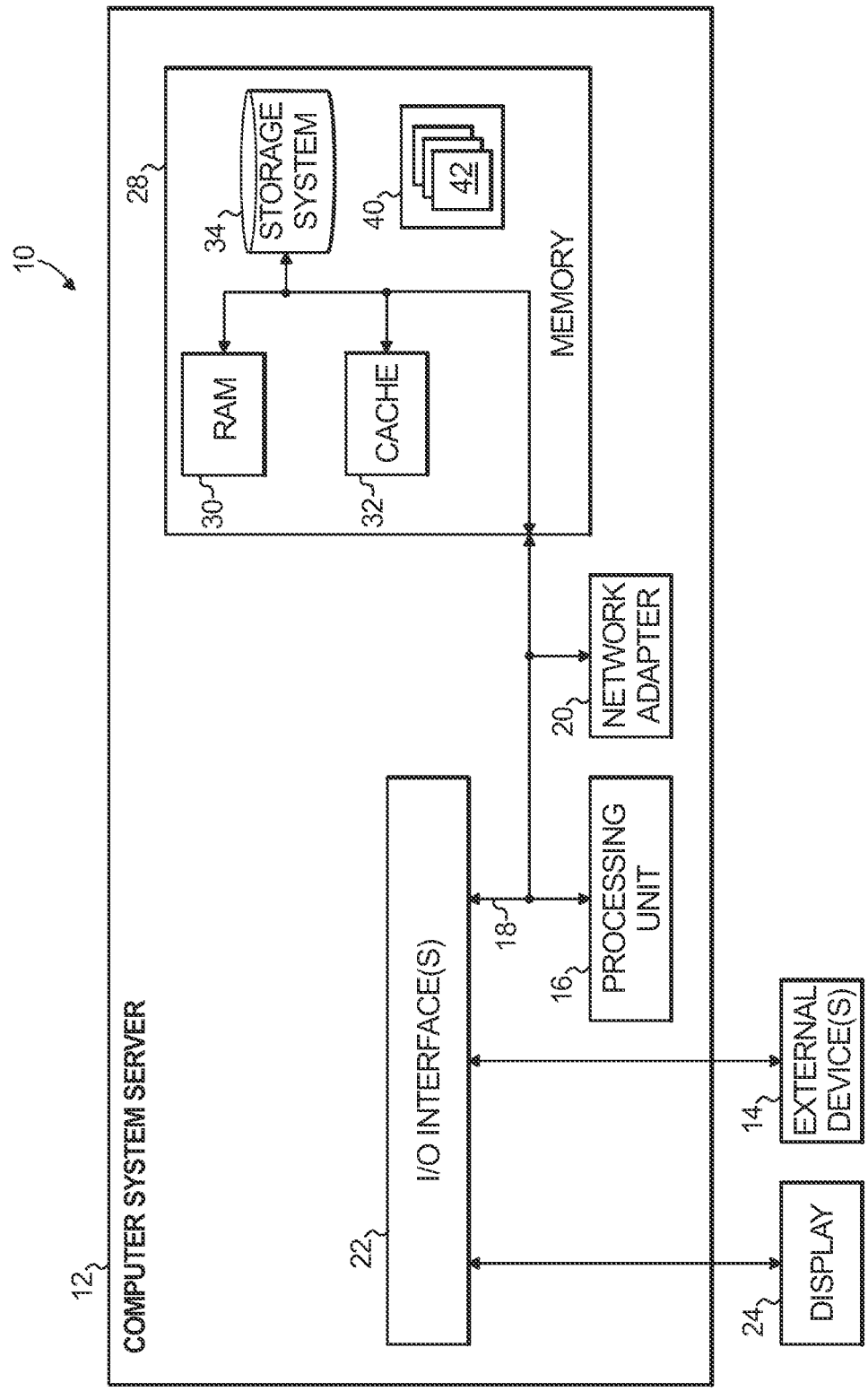
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
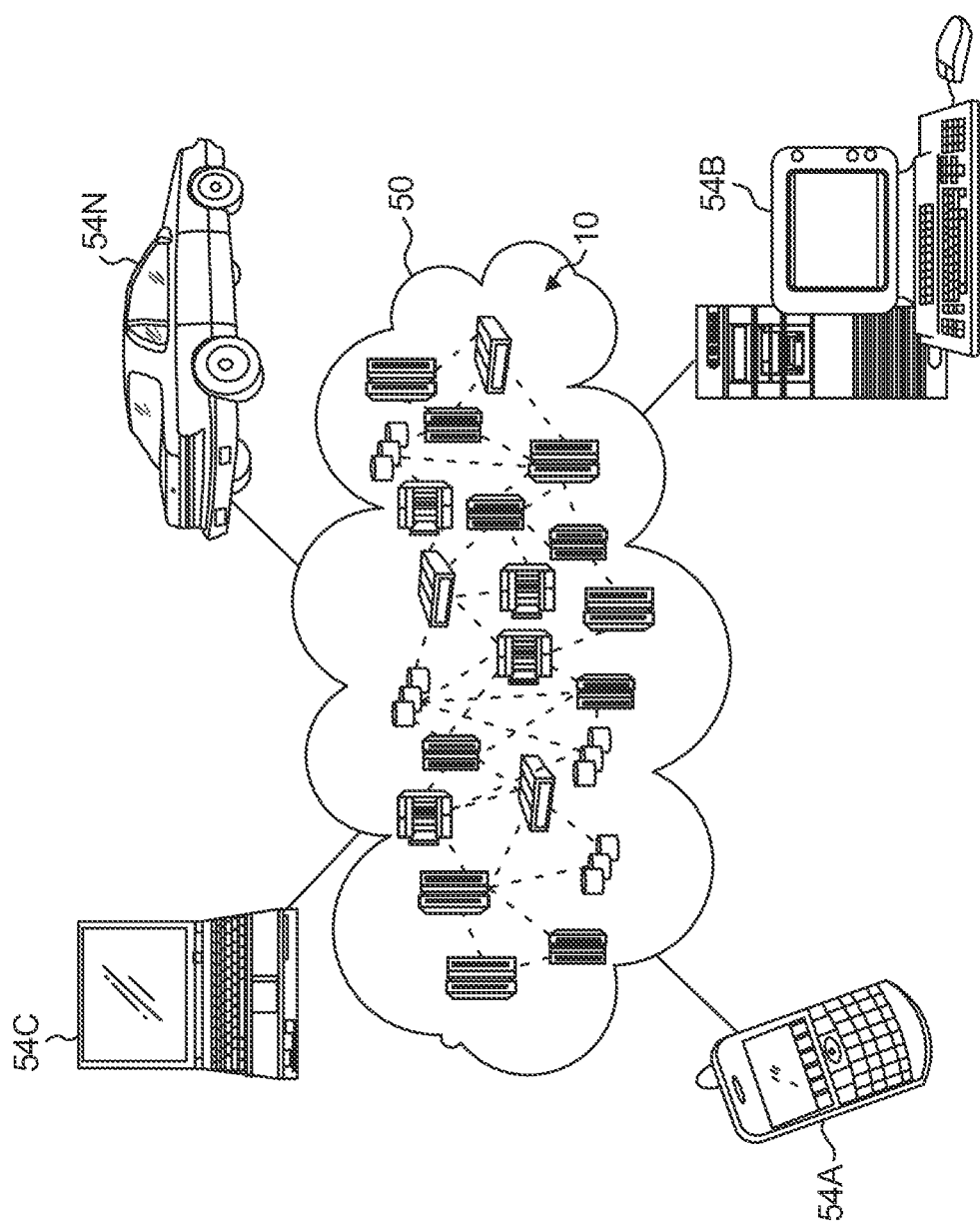
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
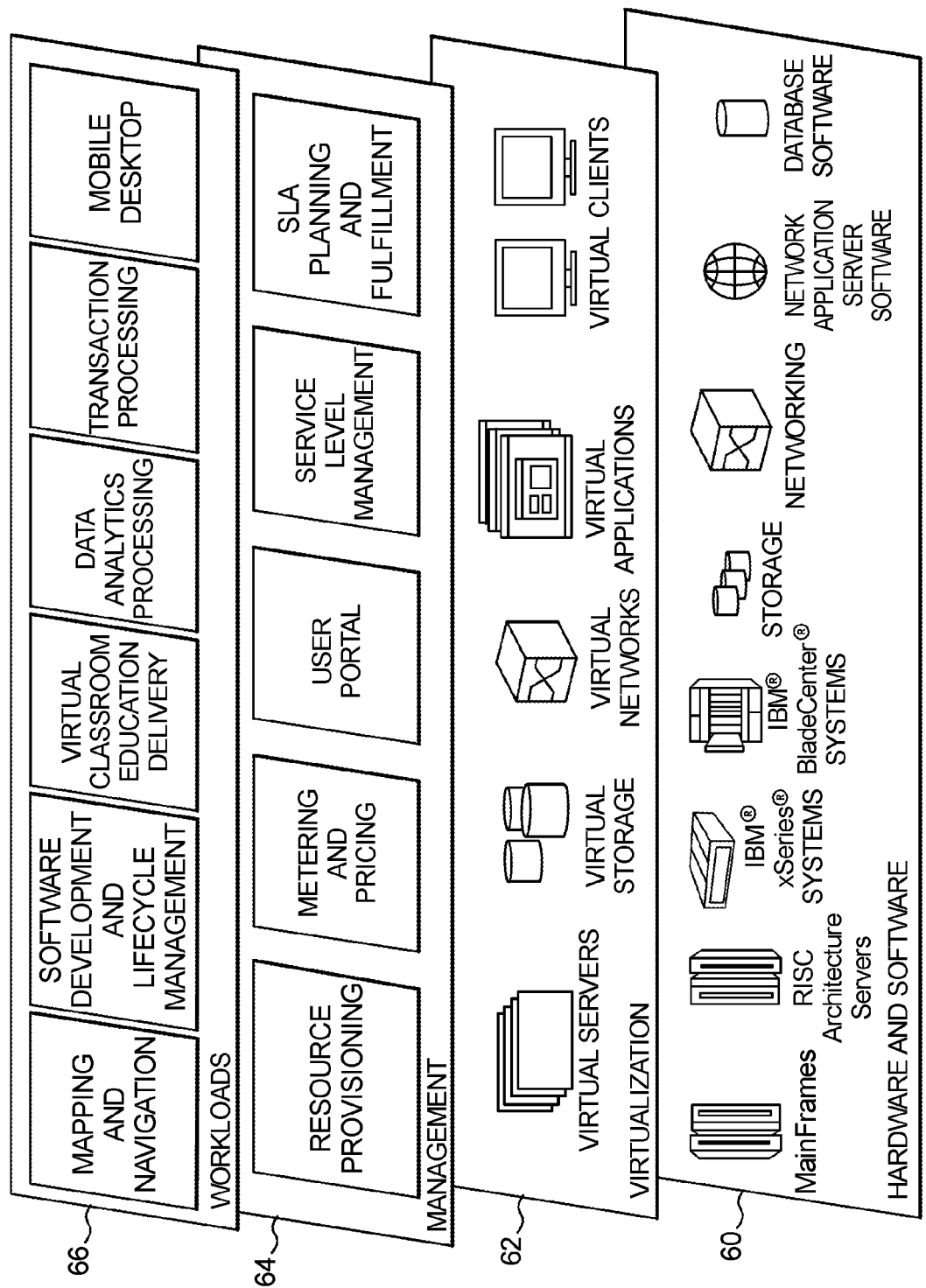
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, fast growth of the cloud platform's scale and complexity calls for more sophisticated operation management. Problem diagnosis is one pertinent aspect in the domain of cloud operation management. However, operational log analysis for problem diagnosis is becoming more challenging. On the one hand, the volume of logs generated on a daily basis is overwhelmingly large, while on the other hand, with the increasing number of service components, the cross-component interactions of a cloud platform become more complex.

One or more embodiments advantageously address these challenges, using an inventive tool set that enables operators to quickly identify the log entries that are potential leads to the root cause of the problem. The tool is based on the use of reference models of logs that represent the standard correct executions. When a problem occurs, one or more embodiments of the tool enable operators to inspect the differences of current logs with the reference model and present a set of logs that are likely to contain the hints to the root cause. To support these capabilities, there are several pertinent inventive techniques. First, inventive log correlation techniques identify and isolate log entries that belong to the request that failed. Second, an efficient log comparison technique helps to understand the differences between log sets. Finally, exemplary tool interfaces highlight the high-value log entries that are likely to contain important information pertaining to the problem.

Experiments were conducted wherein an exemplary tool was applied to a popular cloud management system, OpenStack; the experiments have confirmed that an exemplary tool embodiment can help operators perform diagnosis more effectively.

As noted, as the cloud grows in size and complexity, the challenges of managing it efficiently also grow. One particular challenging aspect of cloud management is problem diagnosis. That is, when a problem happens in the cloud, how can operators quickly identify its root cause based on the operational data collected from the cloud? This aspect is quite pertinent to maintaining the quality of cloud service. This aspect is challenging because the cloud management system often includes multiple, distributed components that are responsible for different functions, e.g., compute, storage, network, identity, image, etc. In the case of the popular OpenStack cloud management system, the system started out with two components in October, 2010 and rapidly grew up to include more than ten components as of October 2014, releasing a new version every five months. During those ten releases, the number of lines of code increased by 30% each release. In such a complex distributed environment, when a problem occurs, e.g., when a virtual machine (VM) launch operation fails, the root cause may lie in any of the related components, for numerous reasons. Therefore, diagnosing the problem typically requires collectively analyzing all the operational data gathered from these components.

Operational logs are commonly used for problem diagnosis. However, a large scale cloud generates an overwhelmingly large amount of logs on a daily basis. The task of looking for clues for problem diagnosis in these logs is considered as "searching for a needle in a haystack." Without proper tools, it is extremely challenging to identify log entries relevant to a specific problem, from the large number of log entries generated by the system. Even if tools can be developed to filter out irrelevant log entries, another challenge is in interpreting the relevant logs, which is a labor-intensive job, and requires someone to have in-depth knowledge of the whole cloud system in order to be able to reason about the possible root causes.

Advantageously, one or more embodiments provide a log analytics tool that helps operators quickly identify the log entries that are potential leads to the root cause of a problem. Consider that, for a stable cloud management system, the behavior of different components should be predictable, when processing a certain type of user request. Therefore, historical logs can be generated for a certain type of request to build a "reference model" that represents the normal behavior of the system. When the system fails to process the same type of request, the operator can compare the logs collected for the failed request with the reference model, and deduce what the problem might be, based on the deviation of the current logs from the reference behavior.

Several issues arise in building a practical tool with this approach. For example, a non-trivial task is to identify and isolate the log entries generated from a particular request, from the bulk of log entries generated in the system in the same time (e.g., triggered by other requests to the system and/or periodic background activities). Another issue is to come up with a proper representation of the reference model that can capture the log information in a succinct manner, yet be instrumental to the analysis of deviation of a failure run from the reference behavior. Furthermore, we have found that after identifying the deviation, it is desirable to help the operator zoom into the small subset of log entries that are likely to be the leads to the root cause.

One or more embodiments of a log analytics tool for problem diagnosis provide solutions to each of the problems described above. For identifying and isolating logs related to a request, an inventive method is provided, based on analyzing various identifiers embedded in logs as a name-value pair. These leverage the fact that distributed systems employ various identifiers for communication and coordination, and it is possible to develop rules to select log lines through careful analysis of identifier relationships. For identifying the deviation(s) from the reference model, one or more embodiments employ a log comparison algorithm using log template information. This aspect further employs an inventive hybrid log template extraction methodology that combines source-code parsing and black-box learning techniques. Further, one or more embodiments provide a user-friendly visualization interface to facilitate the problem diagnosis process.

Detailed design of these techniques is set forth herein, and experimental data is provided to demonstrate effectiveness. In a non-limiting exemplary embodiments, the inventive tool targets OpenStack, an open source cloud management system that has quickly gained popularity in the Infrastructure-as-a-Service (IaaS) industry. The tool has been applied in experiments to scenarios from three problem cases, all of which represent realistic scenarios: resource outage, component unavailability, and misconfiguration. While the non-limiting examples are provided in the context of OpenStack, the skilled artisan, given the teachings herein, will be able to adopt inventive techniques to other cloud management systems as well.

Process Model of Log-based Problem Diagnosis

Upon detecting problems, operators try to resolve them as fast as possible using various tools available at hand. Their ultimate goal is to find out the root cause of the problem so that they can come up with counter measures. In order to find the root cause, they first collect various information such as logs, system metrics, and/or configurations. Then, they try to analyze the data using domain knowledge, experiences and intuitions to make the best sense out of the observed symptoms. These steps are directed toward understanding:

i) what has happened; and
ii) what should (not) have happened.

Logs are the primary source of information for addressing the questions above, and are often the only information available for diagnosis from mission-critical production servers. Sometimes, logs may contain direct hints as to what the root cause is. In other cases, however, it is challenging to use logs to find answers those questions. The trend of increasing complexity of software leads to a larger volume of logs that surpass human processing capacity. To alleviate this, log management tools have been developed to provide powerful indexing, filtering and search capability. However, understanding what has happened through 'search' is still a difficult task. For example, as in initial matter, consider that figuring out what to search for is not straightforward. Other challenges arise from the fact that related logs are scattered across multiple files and that the log messages may be cryptic. Understanding aspect (ii), what should (not) have happened, is even more difficult. It requires in-depth understanding and experience from domain experts. Even for them, it is time-consuming, error-prone and overwhelming to navigate through large volume of logs to construct the mental model of correct and expected log behaviors to eventually perform comparison with current logs.

One or more embodiments address such challenges in using logs for problem diagnosis, by providing a general problem diagnosis tool that significantly reduces the time and effort needed to discover the root cause of the problem. One or more embodiments use logs from (preferably all) the distributed components as the primary input to the tool sets. One or more embodiments construct a reference model of logs per request type that defines what the normal and correct log patterns are in a healthy state. The reference model works as a basis for comparing the given raw log data to quickly understand how it differs from the normal pattern.

Figure 4:
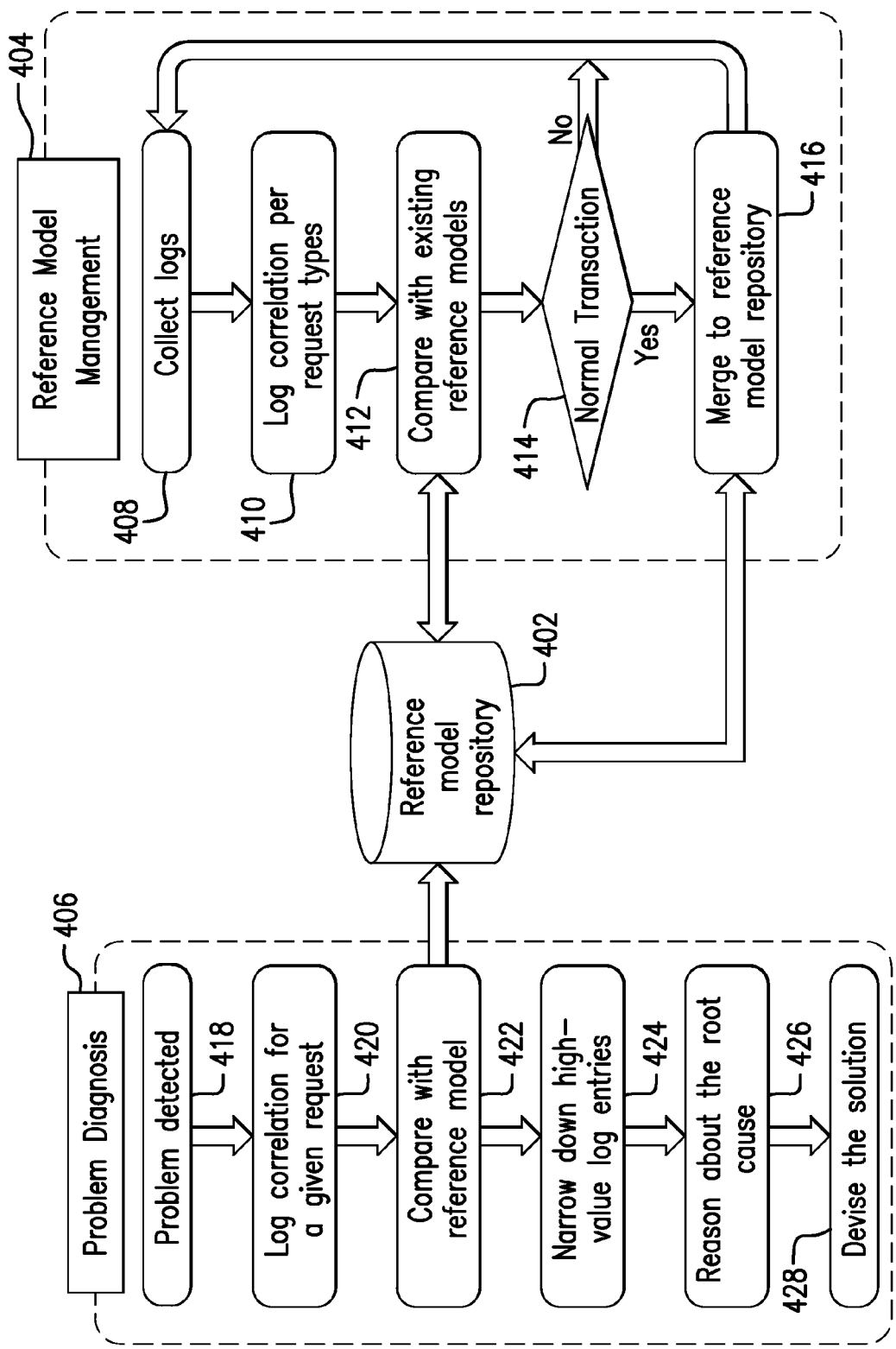
FIG. 4 depicts an exemplary problem diagnosis process and reference model management process, according to an embodiment of the present invention.

FIG. 4 depicts an exemplary problem diagnosis process and the reference model management process. Reference model repository 402 contains the log set per request types to be used as a basis for comparison when the log set of a failed request is given. FIG. 4 depicts two processes centered on the use of reference models for problem diagnosis. One process 404 is for constructing the reference model. In the other process 406, the reference models are used to compare the log data that are collected when the problem(s) occurred.

Referring to FIG. 4 "Reference Model Management" 404, the collection of logs in step 408 can be carried out, for example, with RSYSLOG, a built-in utility available on most Linux-based servers. The skilled artisan will be familiar with RSYSLOG per se, and given the teachings herein, will be enabled to utilize same to implement one or more embodiments. The log correlation in step 410 can be carried out, for example, by custom PYTHON code implementing Algorithm 1 and Algorithm 2 from FIGS. 7A, 7B, and 8. Comparison with the existing reference model in step 412 can be carried out, for example, by PYTHON code implementing Algorithm 3 from FIG. 10. If the comparison indicates a normal transaction, as per the "YES" branch of decision block 414, merge the collected logs to the reference model repository 402 in step 416. Otherwise, as per the "NO" branch of block 414, return to log collection step 408. Refer to the section below on "Refining Reference Models"—this can be carried out, for example, by custom PYTHON code implementing the logic discussed below.

Referring to FIG. 4 "Problem Diagnosis" 406, the "Problem Detected" 418 refers to detection by a human operator; this step can be taken as a given in one or more embodiments. As on the right-hand side 404, the log correlation in step 420 can be carried out, for example, by custom PYTHON code implementing Algorithm 1 and Algorithm 2 from FIGS. 7A, 7B, and 8. As on the right-hand side 404, comparison with the existing reference model in step 422 can be carried out, for example, by custom PYTHON code implementing Algorithm 3 from FIG. 10. Note, however, that while the computation and processing are the same as on the right-hand side 404, the data is different in that on the right-hand side 404, the data is typically taken from normal (non-problem) runs while on the left-hand side 406, the data includes at least one set of data from after the problem has occurred.

Figure 6:
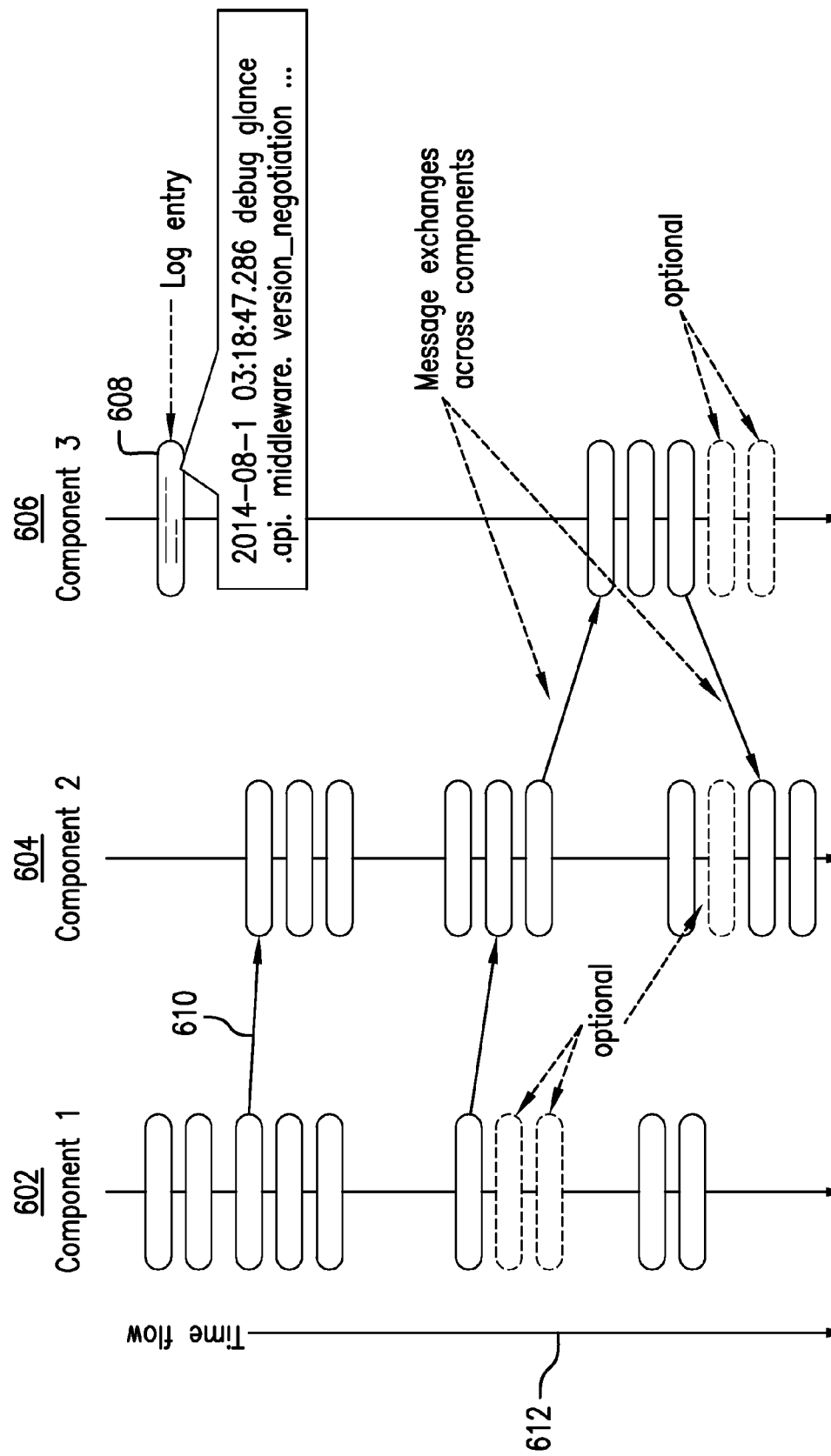
FIG. 6 depicts an exemplary reference model for a given request type, according to an embodiment of the present invention.

The narrowing down of the high value log entries in step 424 can be carried out with a visualization model of the tool, as discussed below. See, e.g., FIGS. 6, 9, and 12A-12B, and accompanying text. Note that actual data sets may be more complex than the examples, and thus the need for visualization is greater. In one or more embodiments, the timestamps in each of the log lines are noted and drawn. Each vertical line in FIG. 6 is a different component and each oblong is one log entry. The indicated functionality is provided, in some embodiments, via PYTHON with visualization via the Raphael JavaScript library.

The identification of the root cause 426 can be carried out via a human operator, based on the narrowed-down space presented by the tool. The fixing of the problem 428 (devising solution) can also be carried out via a human operator.

Referring now to FIG. 3, problem diagnosis aspects of the invention may conceptually reside in the management layer 64 and may diagnose issues with one or more workloads in layer 66. Ultimately, code resides in physical memory (which may or may not be virtualized) and executes on a physical machine (which may or may not be virtualized), and data resides in physical storage (which may or may not be virtualized). Physical resources are in layer 60 with optional virtualization in layer 62.

To address the question of 'What has happened,' a tool set according to one or more embodiments automatically constructs the set of correlated logs for each of the operations performed. This information serves three purposes. First, it is graphically visualized with various annotations to help administrators understand how the operations progressed. Second, this prepares the current log data into a format that can be compared against reference models. Third, this also prepares the log data so that it can be merged into the reference model if necessary. The challenges of log correlation and further details are provided below under "reference model construction and refinement."

Finding the answer to the question of 'what should (not) have happened' is addressed by one or more exemplary tool sets via log comparison algorithm using log template information. One or more embodiments advantageously provide to the administrator the part of the logs which deviate from the reference model, as well as the logs that have the potentially high-value information. Refer to the discussion of "log comparison" below.

OpenStack Cloud Platform

Figure 5:
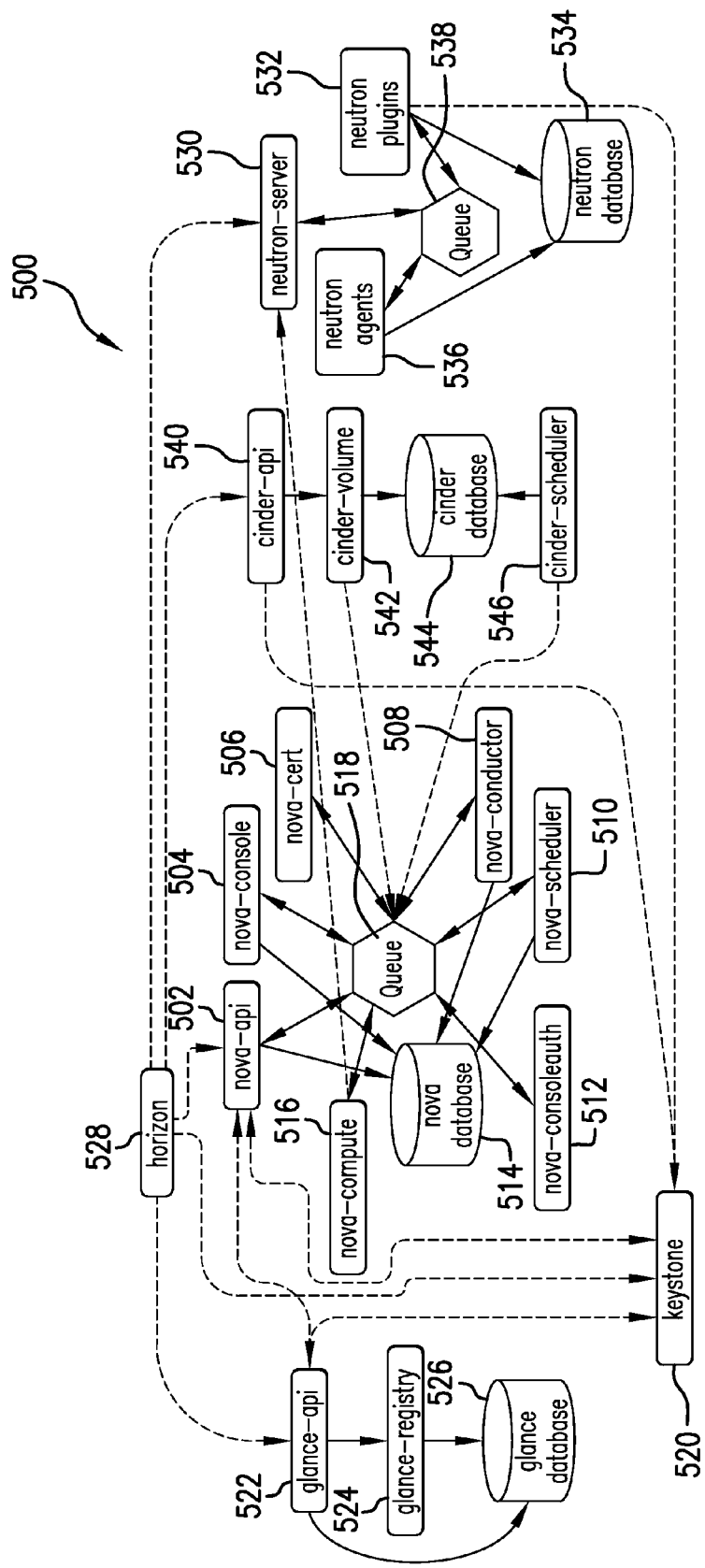
FIG. 5 depicts an OpenStack logical component architecture diagram, according to the prior art.

FIG. 5 shows an OpenStack logical component architecture diagram. OpenStack is an open-source cloud computing software platform. Built by the open source community, OpenStack has a modular and distributed architecture 500 as shown in FIG. 5. Major component groups are nova (Compute service), keystone (Authentication) 520, glance (Image service), neutron (Network), heat (Orchestrator) (omitted from FIG. 5 but skilled artisan will be familiar with same), horizon (Dashboard) 528 and cinder (Block storage). Regarding nova, note nova-api 502, nova-console 504, nova-cert 506, nova-conductor 508, nova-scheduler 510, nova-consoleauth 512, nova database 514, and nova-compute 516, all interacting with queue 518. Regarding glance, note glance-api 522, glance-registry 524, and glance database 526. Regarding neutron, note neutron-server 530, neutron plugins 532, neutron database 534, and neutron agents 536 all interacting with queue 538. Regarding cinder, note cinder-api 540, cinder-volume 542, cinder database 544, and cinder-scheduler 546. Each service component is responsible for a specific function and is developed by different developer groups. Cross-component communication in OpenStack is performed via either message queue or REST calls.

Each component generates logs in its own log files. Configuration can be changes so that all the logs from components are sent to the syslog facility. In the OpenStack logs, no global identifier is available for tracking inter-component interactions. For example, the request ID information in nova log files can only be shared among nova components. Other OpenStack service components which have interactions with nova cannot obtain such tracking information. Recently, there have been some efforts to introduce global request id in OpenStack API requests. However, this proposal has limited coverage, and has not yet been implemented in all of the service components.

Each log file includes many log types, such as the background log entries which have no relation to specific operations, and the transactional log entries from different operations and components. Different types of log entries are mixed in log files Moreover, with the increasing of cloud scale, the amount of log entries increased dramatically. Though there are many efforts to make the log-based problem diagnosis easier, there is no separate problem diagnosis service in OpenStack.

Exemplary Tool Set Design

Reference Model Construction and Refinement

The 'reference model' is a representation of normal request processing flows in terms of logs. The assumption is that, for the same request type, the relative timing, ordering and formats of the log entries generated by different cloud management components roughly remain consistent each time, if the request was handled correctly. FIG. 6 shows an example reference model for a given request type. Some of the log entries are optional. Their appearance or absence in log set does not affect the conformance to this reference model. In particular, FIG. 6 shows a conceptual representation of a reference model for specific request processing, involving three management components 602, 604, and 606, in a cloud. The vertices (e.g., 608) represent individual log entries. Arrows between them (e.g., 610) indicate the message exchange activities. Note that arrows are drawn only when log entries contain information about sending and receiving activities with unique identifiers. Thus, not all the message exchanges will be captured by the reference model. Arrow 612 shows time flow from earlier to later.

Even though most logging activities are consistent during normal operations, certain variations are observed, usually caused by different parameters customized in the user request or by other run-time behavior of the system. The exemplary reference model captures the log entries as 'optional' as well.

Constructing these reference models from logs involves developing several log processing techniques. First, filter out log entries specific to a request from the bulk of background logs. The common approach is to search for identifiers embedded in the logs that can map to a certain request. However, modern distributed software makes increasing use of various identifiers to convey the identity of request, users, sessions or credentials, but rarely defines a unique identifier for logging in all components so that it can be used for the filtering. Rather, different components may define different identifiers for only part of the request processing flow. Therefore, one or more embodiments provide techniques to discover the relationship between these identifiers, and piece together the end-to-end view of request handling, represented in logs. One or more embodiments provide an algorithm that mines the relationships between different identifiers. Furthermore, one or more embodiments provide techniques for comparing two log sets—usually one side from the reference model log set and the other side from the newly collected log set. The goal of the comparison is to find out the most likely pairings of log sequences from two log sets so that those log entries unique to only one side can be identified. The information of the unmatched unique log entries is useful in two ways. During the reference model refinement process, treat them as variations from otherwise consistent log patterns and encode this knowledge into the current reference model. During the problem diagnosis, unmatched log entries are considered as deviations from the normal log pattern. In order to design efficient comparison mechanisms, choose what to use for comparison and design algorithms. One or more embodiments provide comparison algorithms based on the log template information. Further, one or more embodiments provide ways to encode information into reference models so that the variations can be easily captured.

Log Correlation:

The goal of log correlation is to identify and isolate the log entries that belong to the same request type from the raw log data. A non-limiting exemplary technique, according to an embodiment, is based on analyzing identifiers' name and value pairs embedded in the logs. Logs from modern distributed applications contain a large number of ID and values. Identifiers can be embedded into logs as defined by the log templates in the source code, or they can exist as part of the messages. Often, distributed components record into the log the entire content of exchanged messages which follows XML (eXtensible Markup Language) or JSON (JavaScript Object Notation) format. This makes it easy to parse the logs and extract IDs with corresponding values. A high level description of the algorithm is now provided. Suppose the keyword of an ID that represents a user-initiated request is known. First, search for the ID and pick up the values. Using each value of the request ID, it is possible to select all the log lines that contain the value. This will provide a first set of correlated logs. In this log set, search for the log line that contains other type(s) of ID, value pairs. This could be, for example, a temporary ID assigned just for one instance of message exchange, or an ID for sub-request that this component is issuing to another service(s). Therefore, go through the uncorrelated logs and search for this newly found ID value. Any log line that contains the ID value will be put into the correlated log set. However, not all the IDs can be used for further correlation. The scope of the ID may be larger than the initial request ID that was used. For example, if the session ID's value is sued to correlate more logs, it will bring in logs that belong to different requests. In order to prevent this, perform careful analysis of relationships between IDs. Algorithm 1 of FIGS. 7A and 7B is provided for this purpose. Algorithm 2 of FIG. 8 describes how the log correlation proceeds using the rules discovered from Algorithm 1.

The algorithms take advantage of several observations. First, many identifiers exist in the logs. This is because IDs are required to transfer context information from one component to another, especially in heterogeneous systems. Second, a log line contains multiple identifiers. IDs in the same line provide ways (i.e. connecting point(s)) to expand the correlation to other components which may use different IDs. This is partly because components often dump entire message(s) in JSON into the log. Third, the majority of the ID values follow standard formats. The most common one is the UUID (Universally Unique IDentifier) format of [a-z0-9]{8}-[a-z0-9]{4}-[a-z0-9]{4}-[a-z0-9]{4}-[a-z0-9]{12} in regular expression. Another common format is [a-z0-9]{32}. In addition, ID keyword and the value pairs are packaged using popular JSON format, which allows development of generic parsing methods. The exemplary algorithms make the following assumptions. First, UUID values are globally unique. Second, identifiers are related if they appear in the same line.

Algorithm 1 of FIGS. 7A and 7B describes how to generate log correlation rules. One of the inputs is the raw log file. Another input is the pattern string that can be used to find initial ID values. These values are used to create the first correlated log sets. The outputs are the list of ID names whose values are to be used for log correlation. More particularly, what is specified includes how many rounds of correlations to perform, and for each round, which ID names to look for to collect the ID values for later correlation.

Lines 1 to 18 of Algorithm 1 of FIGS. 7A and 7B describe the preparation of correlated log sets and uncorrelated log sets. This algorithm uses the pattern string to first collect all the ID values by scanning the entire log lines. Then, for each ID value, it filters out the log lines that contain ID values and saves them separately in the list; the list is put into a dictionary A hashed by the ID value. The rest of the unmatched log lines are stored in the uncorrelated log set list B. Entering the while loop, lines 20 to 25 parse the log lines in the correlated log sets and detect the ID, value pairs. Then, from lines 27 to 36, the algorithm performs a test for each discovered ID value(s). The test searches through all the correlated log sets and counts in how many of them the current ID value appears. If the ID value appears only in more than one correlated sets, it is dismissed. This ID value (and the ID name) have a scope beyond the initial request ID and, thus, are not used for further log correlation in the exemplary embodiment. Lines 39 to 51 describe the update of current correlated log sets using new ID names. Going through the uncorrelated logs, the algorithm searches for the ID value corresponding to the newly discovered ID name. Then, any log lines containing the ID value are merged into the correlated log sets. This is done for each of the correlated log sets. With these expanded correlated log sets, the next loop repeats until no new ID name is added to the Rule set.

Algorithm 2 of FIG. 8 describes the steps of log correlations using the rules produced from Algorithm 1. The algorithm starts with the first ID value that represents a specific request that it is desired to produce the correlated log set for. Lines 1 to 9 scan through the logs and place all log lines that have the initial ID value into the correlated set A. The rest of the logs are placed into B. Then, during the loop in lines 11 through 24, Algorithm 2 collects all the ID values of the ID names specified in the rule set R for that round. These ID values are used to correlate more logs into A. After all rounds are completed, A contains all the correlated log lines identifiable from the rule set R.

Log Comparison:

The capability to compare two log sets is used in two ways in the exemplary tool set. First, it is used to learn the variations of log patterns from the same request types. This information is used to refine the reference model of that request type. In the reference model, mark each log entry as mandatory or optional so that, later, presence or absence of certain log entries in newly collected log sets can be determined as normal or abnormal. Second, during the problem diagnosis, the information is used to determine the deviations of current request(s) from the reference model. The result of the comparison highlights which part of the log entries in which component is significantly different from the normal pattern. This deviation region guides operators closer to the log entries that are more likely to be useful for the problem diagnosis.

FIG. 9 presents an overview of the log comparison task. Two log sets are represented as graphs 902, 904, and each circle (e.g., 906, 908) is one log line. An exemplary comparison of component 2 is shown. For component 2, two log entries 910, 912 on the right-hand side are shown not to have a matching pair on the left-hand side. FIG. 9 thus describes the log comparison operation. The input to the log comparison is two log sets of the same request type(s). Both log sets contain logs from n components (n=3 in FIG. 9). The comparison is performed separately for each component.

The goal is to align log sequences of each corresponding component from two sides, and identify which log entries are missing on the other side.

For comparison of individual log entries, use the ID of log template. Log lines consist of static text parts and dynamic variable parts. If the dynamic variable parts are removed, a set of static text patterns are obtained, which appear in the log repeatedly. These static texts are referred to as Log Templates and each message is matched to its own template. Using the log template ID, the comparison of two log lines becomes a simple integer comparison. The set of all the possible log templates is assumed to be already discovered before performing the comparison. Also, the template ID is already determined for each log entry beforehand. An exemplary method of discovering log templates is described in more detail below.

Algorithm 3 of FIG. 10 describes how to align log entries of two log sets using template IDs. The inputs are the two log sequences from the same components. The outputs are the updated log sequences that are aligned by blank logs inserted to the other side where there are log entries unique (i.e. unmatched) to one side. For a given pair of log entries from two sides, in order to determine the next matching pair, perform two scans. Fixing one log entry on one side, compare the template ID with each of the log entries on the other side from the first unmatched log entry. Switch the role and compare the template ID. Then, choose the closest matching pair with maximum score. Since either 1.0 is assigned if log templates match or 0 is assigned if not in the current algorithm, there is effectively a search for the closest log entry pair with matching templates. Lines 6 to 14 describe the scanning of matching templates from one side. Lines 15 to 24 repeat the process with roles switched. Then, from line 26 to 34, the algorithm inserts blank log entries to one side so that unmatched log entries on one side are matched with the blank log entries.

Log Template Handling:

As described earlier, the log comparison in the exemplary tool set is based on the log template ID of each log entry. In order to determine the template ID of a log entry, first compile a complete set of log templates. To discover the log templates, employ a combination of two methods—source code parsing and log text clustering techniques. In source code parsing, the exemplary tool identifies logging statements in the code and transforms them into templates in the form of regular expressions. FIG. 11 illustrates log template generation through source code parsing. Examples of logging statements and generated templates are shown in FIG. 11. Although a source code-based technique may discover most of the log templates, it is not able to discover a complete set of log templates because of limitations in source code parsing. One obstacle is the case where log statement contains a reference to some other objects.

In order to increase the coverage, one or more embodiments employ the log text clustering technique. In this method, group the log texts by string similarity scores. Then, by comparing those log texts in the group, identify which part of the log is static and which is variable. This information is encoded into a regular expression by converting the variable part to a wild card (*). This technique can be applied only to those groups with a sufficient number of logs. For rare log text, it is difficult to detect the static and variable parts of the string, and thus, the entire log text is treated as a log template.

Log Templates Matching at Runtime:

The log template discovery process described above is an off-line one time process that does not impact the problem diagnosis. However, during the actual problem diagnosis, the log template matching process could become a bottleneck since regular expression matching should be done with the entire log template lists for each log line. To mitigate this problem, employ an appropriate strategy. First, categorize the templates by the component name, and further subcategorize by the log level. Then, log templates in the subcategory are sorted by the descending order of popularity. Although the number of entire log templates are large (>5000), the popularity of log templates follows a power law. For a given log entry, it will find a matching template within 30 templates for 90% of the time.

Refining Reference Models:

The role of reference models is to provide a basis for determining if newly given log set of specific request type is normal or not in terms of log patterns. If the reference model is too rigid, the log set would be misjudged as abnormal when it only contains minor variations. To avoid this, the reference model should capture the general log patterns as well as any variations that might appear due to nondeterminisms in distributed applications. To support this, the exemplary tool set is designed to expose an interface to the users through which they can pick the log sets to be considered as normal. Once selected as normal, the exemplary tool set performs the comparison, identifies the variations and records them into existing reference models. This process is referred to as 'reference model refinement.'

Applying Reference Model for Problem Diagnosis:

In order to support effective problem diagnosis, the exemplary tool set provides a set of user interfaces. During the steady state operations, operators monitor the status of the target application through the operational dashboard. This dashboard provides various information, such as trends of log volumes, lists of requests issued by the users, request types and lists of log entries collected in real time. One of the windows shows the request ID of any failed user request. Failure can be automatically detected by searching for ERROR logs and the associated request ID in the log entry. FIG. 12 (includes FIGS. 12A and 12B) shows problem diagnosis using the exemplary tool set. Three interfaces for operators are provided. The operational dashboard 1202 of FIG. 12A is used during steady state monitoring. Log comparison visualization 1204 of FIG. 12B is used to understand how the failed request deviates from the reference model. The operator can investigate further by viewing individual log entries using log text comparison of "reference" to "current.". The exemplary tool set highlights the deviations and potential high-value log entries so that operators can quickly narrow down to the root cause. FIG. 12A shows an illustration of the operational dashboard. In the exemplary implementation, popular data visualization software, Kibana, was employed to construct the operational dashboard.

If request failures are detected, operator can click one of the request IDs in the list of failed requests 1208. This opens up detailed visualization of comparison between the failed request and the reference model (FIG. 12B). Request type is automatically detected and the correct reference model is retrieved. The visualization shows the log entries of the reference model along with the logs from the failed request. Any deviation from the reference model is automatically highlighted by the exemplary tool set for easy understanding. This window provides the overall view of the failed request, such as at what stage the failure started and from which component.

The operator can further dive into the problem by clicking component names and opening log text comparison windows, which list actual text of log entries from both the reference model and the failed request ("current"). Log entries lying in the deviation region are highlighted. ERROR logs are also colored in red (or other vivid color) in one or more embodiments so that they can be easily spotted. In addition, log texts that are from rarely occurring log templates are marked.

High-Value Log Entries:

One of the features of the exemplary tool set for speeding up the diagnosis is the detection of high-value log entries that are likely to contain hints to the root cause of the problem. In determining the high-value logs, use the information of the log templates' frequency. If a log's template is the rarely-seen one, consider it to be likely to contain useful information. This is because the appearance of rare logs indicates that the control flow has taken the path that usually is not covered, and, thus the log content would probably contain important information. The notion of grouping the logs by templates and presenting them by the template's frequency is similar to that employed in Sumo Logic. However, such grouping might still include many rare logs that are not actually related to the failure currently under investigation. The exemplary tool set further narrows down the candidate logs to the smaller set, even after the initial log correlation, by considering log entries that lie within the deviation region.

Exemplary Experimental Evaluation

Problem Diagnosis Case Study

Problem from Insufficient Resources:

A first experimental case study addresses the problem with failure to launch a virtual machine (VM) instance due to insufficient system resources. In the OpenStack dashboard web interface, called Horizon, a user can launch a VM of various "flavors." The OpenStack version used in the experiments (version: 2014.1 Icehouse) supports seven flavor types by default—nano, micro, tiny, small, medium, large and xlarge. In order to create a failure of a VM launch, first launch several small VMs to use up system resources. Then, issue the launch of 'large' flavor VM to observe what happened. On the Horizon dashboard, the error message shown in FIG. 14 is obtained. This error message is not very helpful in understanding what actually went wrong, and it is even misleading. If an operator encounters this problem with such an error message, he or she might spend time trying to look for configurations or operating system (OS) settings related to host name or IP address.

Figure 13:
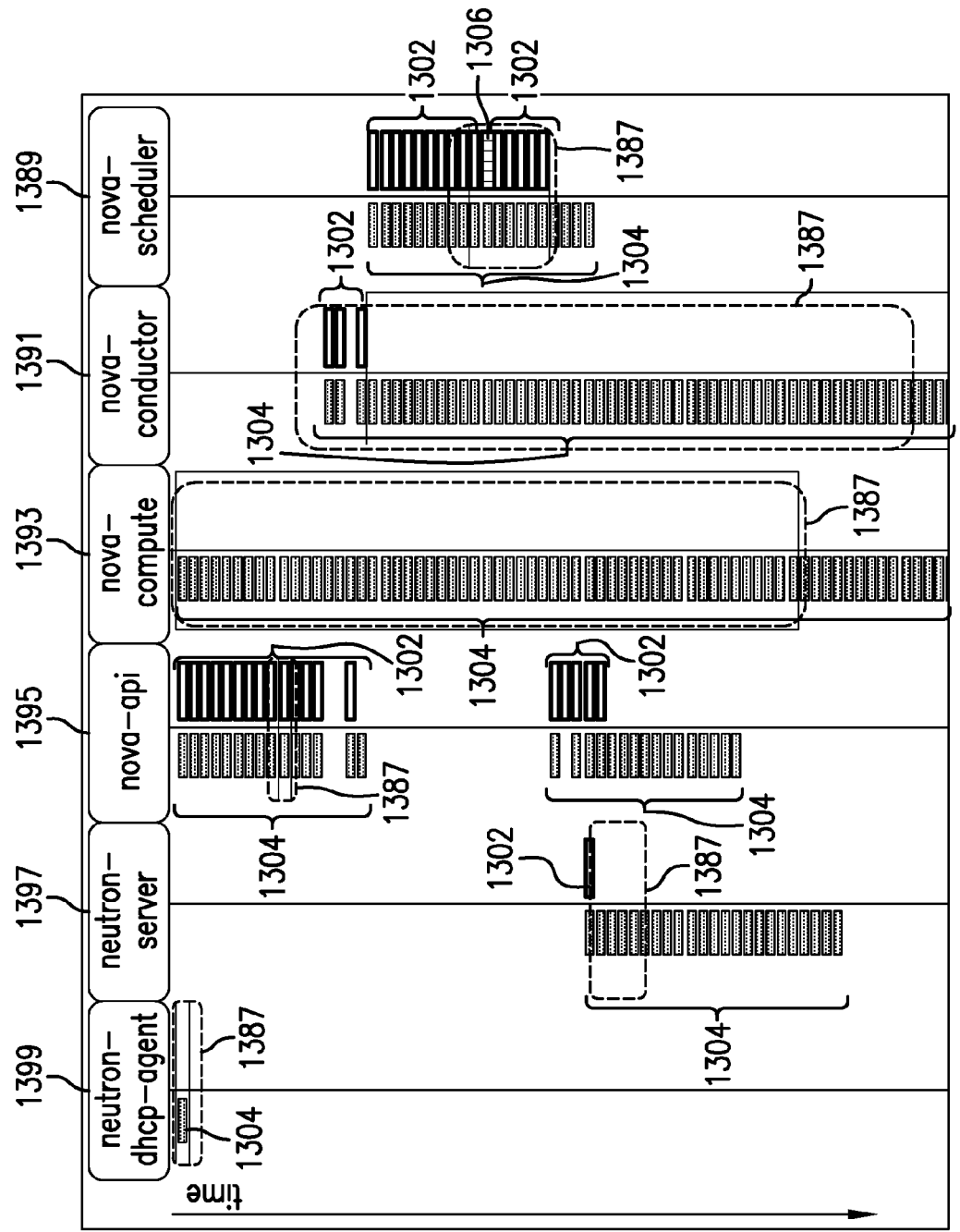
FIG. 13 presents a log plot for launching a virtual machine (VM) under insufficient system resources, which leads to launching failure, which can be addressed using one or more embodiments of the present invention.

As part of the experiment, raw log files were fed into the exemplary tool set to try and find out the root cause for this problem. FIG. 13 shows a log plot for launching a VM under insufficient system resources, which leads to launching failure. FIG. 13 shows the log plot visualization as a starting point of the investigation.

The bars 1302 represent current logs from the failed VM launch and the bars 1304 indicate the correct log entries from the reference model. The bars 1302 are the set of log entries that have already gone through the log correlation steps from raw log data set of much larger size. The reference model for the VM launch operation was trained with 28 runs. Regions 1387 outlined in dashed lines indicate the deviation of current log entries from the reference model. Note that deviation regions are relatively large for 'nova-compute' 1393 and 'nova-conductor' 1391 than for the other components 1399, 1397, 1395, and 1389. From this, learn that nova-conductor 1391 was unable to carry out a large portion of the required steps, and the control did not even reach nova compute 1393 at all because something went wrong even before. Bar 1306 indicates that the log content contains the ERROR keyword, and the nova-scheduler 1389 shows one such bar 1306. Touching bar 1306 with a mouse or other pointing device reveals the log content shown in FIG. 15.

This log's log level is not ERROR, but WARNING and the log message is very generic. If the operator relied only on log searching, he or she would find this log line which does not contain any hints. Without tools such as the exemplary tool set, the next option would be to manually browse through the raw logs for better hints.

For this problem case, the exemplary tool set narrowed down the log entries to the deviation region and, further, pinpointed a few of the potential high-value log entries. In FIG. 13, each component name 1389-1399 at the top is a button and activating it brings up a table that compares individual log entries of both the reference model and the current logs side-by-side. This table also highlights the high-valued log entries within the deviation region. The log entry of FIG. 16 was discovered via the exemplary tool set.

Figure 17:
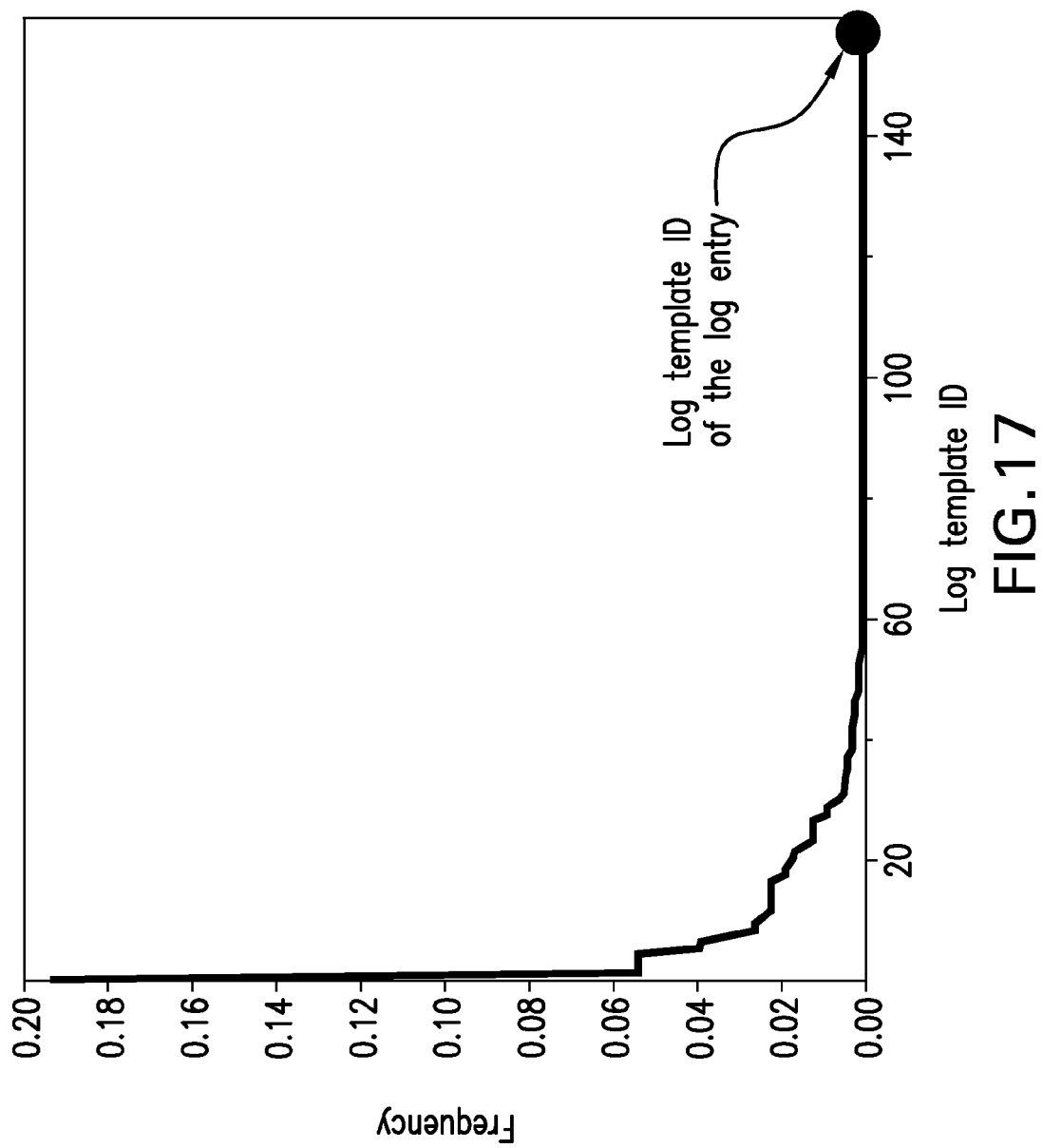
FIG. 17 shows frequency of the log template that has the most important information, according to an embodiment of the present invention.

The log entry of FIG. 16, which is not an ERROR log, directly reveals the root cause of the problem, namely, insufficient resources (i.e. available RAM size). FIG. 17 shows the frequency of the log template that has the most important information; in particular, the frequency of the log's template within the distribution of all templates. This log's frequency of appearance is less than 0.0004%. This problem case demonstrates how the exemplary tool set can be advantageously employed when ERROR messages and ERROR logs do not help understanding the problem. The exemplary tool set can quickly provide an overall view of the problem, narrow down the deviations, and pinpoint potentially high-valued log entries, which advantageously leads to significant time savings.

Figure 19A:
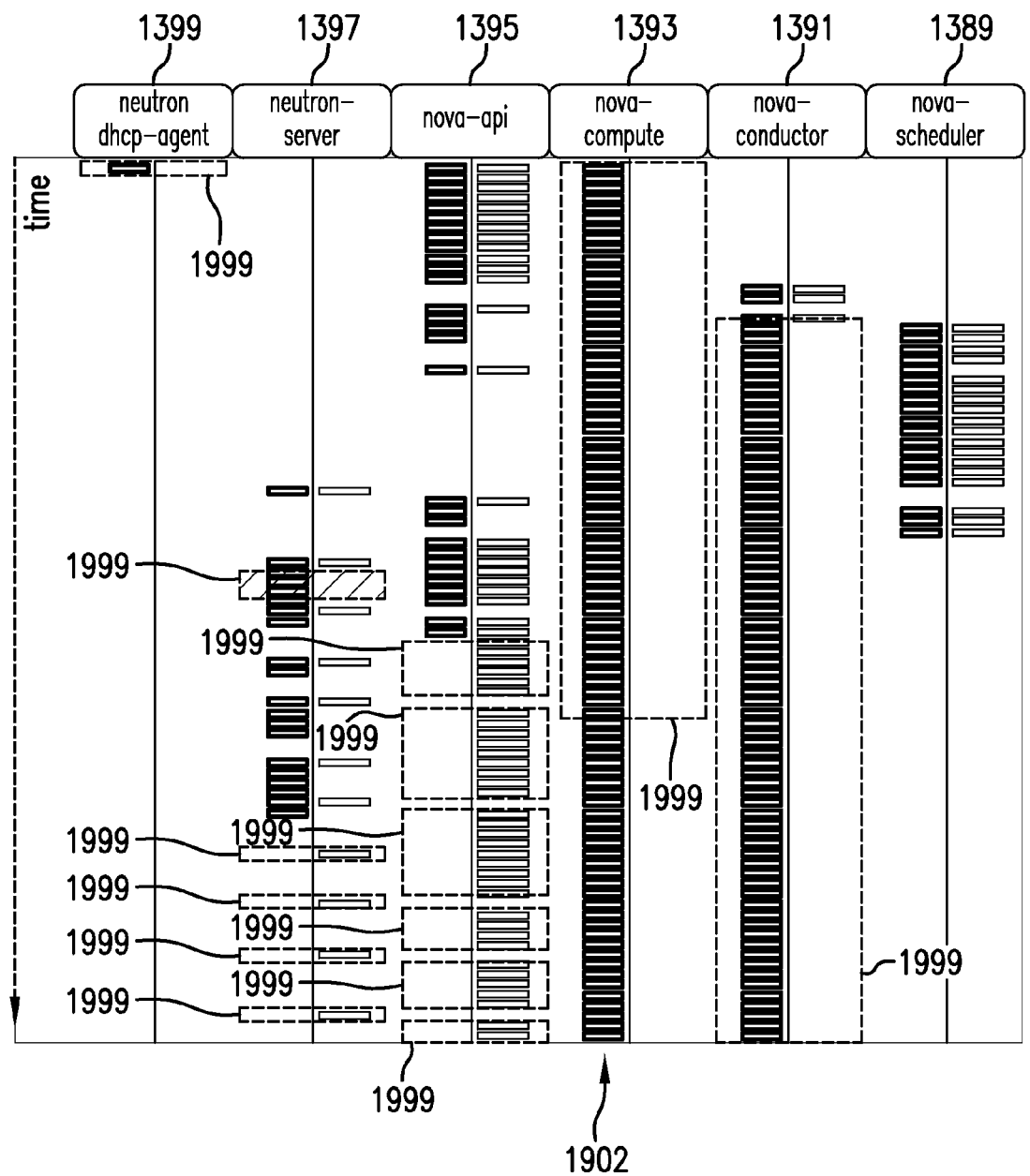
FIGS. 19A, 19B, and 19C depict log plots for unsuccessful VM launches due to nova-compute and nova-scheduler component failures, including unreachable nova-compute in FIG. 19A, silent failure of nova-scheduler in FIG. 19B, and a normal run in FIG. 19C.
Figure 19B:
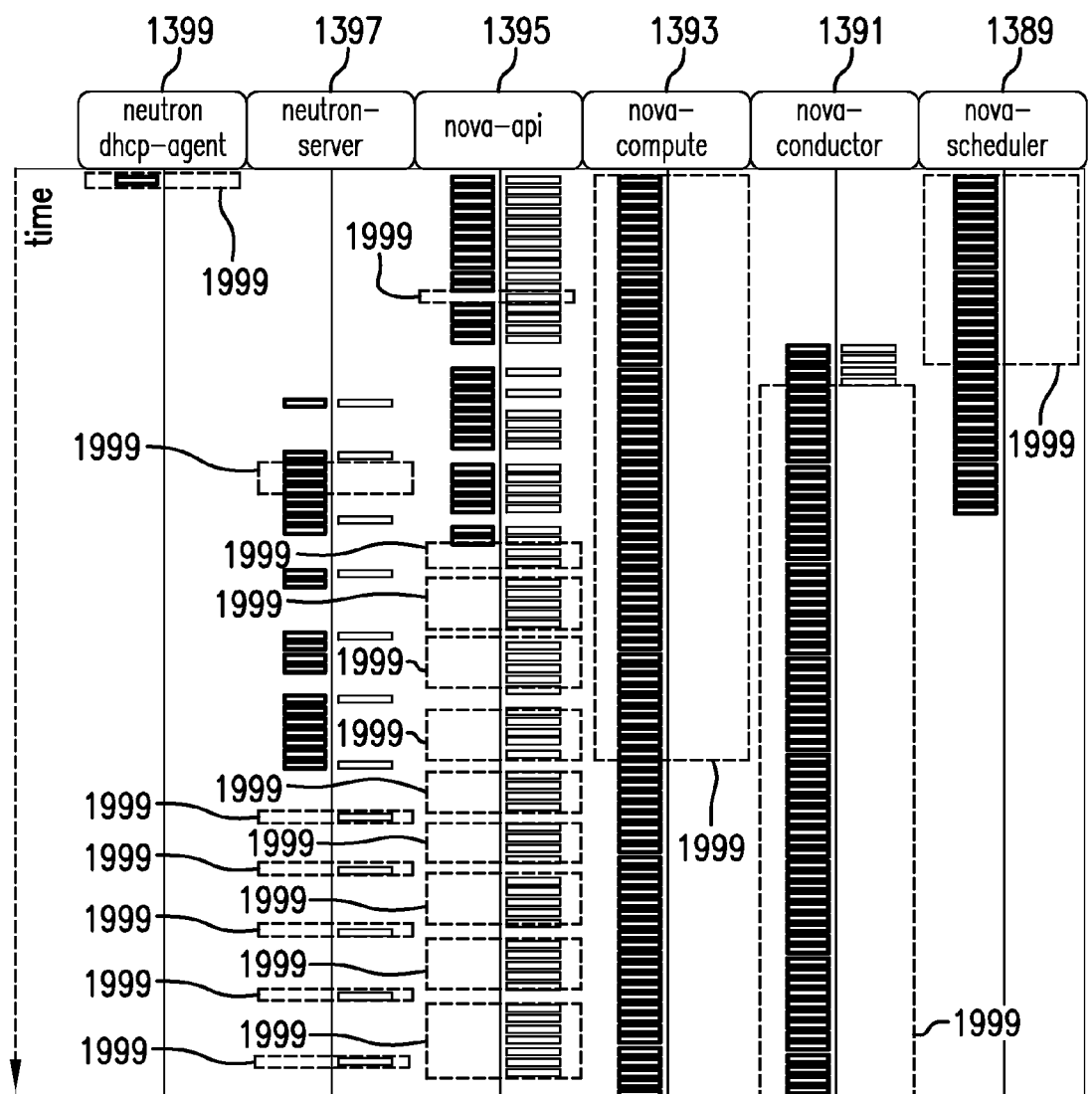
Figure 19C:
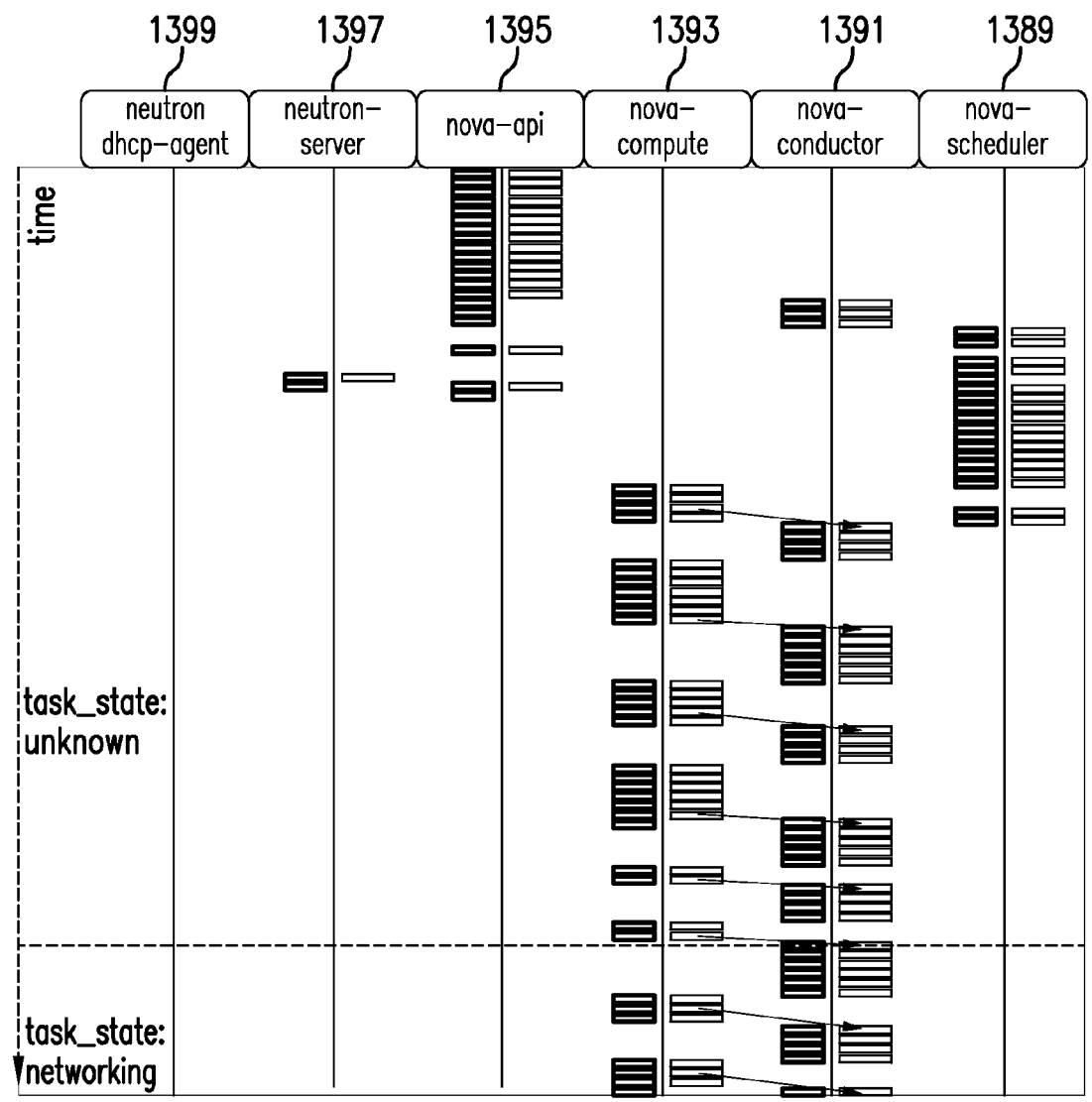

Undetected Component Failure Problem:

In this case study, consider how the exemplary tool set can be used in exemplary problems where VM launch fails because of one of the Open-Stack components being unreachable or not running. The first sub-case is the case of an unreachable nova-compute component. In the enterprise deployment of OpenStack, a typical configuration is to set up a cloud controller in one node including core nova components, and/or message queue, database servers, and to place the nova-compute component in other server nodes where VMs are to be launched. It is possible that the nova-compute component may become unreachable because of network issues or because it crashed from software errors. This problem is a first exemplary subcase and the exemplary tool set was applied to resolve the problem. When a VM was launched from the Horizon dashboard, the launch process hung at the 'spawning' state indefinitely and did not generate any messages of either success or failure. FIG. 19 (includes FIGS. 19A-19C) shows log plots for unsuccessful VM launches due to nova-compute and nova-scheduler component failures (unreachable nova-compute in FIG. 19A; silent failure of nova-scheduler in FIG. 19B; a normal run in FIG. 19C). Dashed-line regions 1999 indicate the deviation of current log entries from the reference model. FIG. 19A is the log plot obtained by the exemplary tool set for this problem case. In this run, no ERROR level logs are generated (no bars like 1306), making it difficult for the operator to detect the problem if searching for ERROR keywords in the logs. We have found from browsing through the log entries of each component that there are no clear indicators of the problems in the log content. The following aspects were observed:

Nova-conductor stopped producing logs after only a few first part of the logs. (See and compare to the normal run in FIG. 19C.

Nova-scheduler behaved normally, producing all the logs it is supposed to generate.

Nova-compute has not generated any logs at all. Reference logs (bars 1902) are drawn from the top of the graph since it could not align with any bar representing current logs. However, from FIG. 19C, it is known that the expected first appearance of the nova-compute logs is where the nova-scheduler's log ends.

Nova-api produces more logs than expected. Looking closely at the actual log texts by clicking the button with the component name, note that the long repetition of 4 log line group at the tail of nova-api logs, which is recognized as deviations.

From these observations, it can be deduced with high confidence that there are some problems with nova-compute. Following the time line of the normal run, other components (nova-api, nova-conductor and nova-scheduler) performed their parts, but only the nova-compute failed to generate the expected logs. This information strongly indicates the existence of a problem with nova-compute. With this knowledge, the operator can focus on verifying the availability of the nova-compute component. Such reasoning is difficult to be carried out using log search tools alone. The exemplary tool set facilitates it by combination of techniques such as log correlation, reference model construction/comparison and intuitive visualization.

Similarly, FIG. 19B shows the lot plot of the case nova-scheduler is inactive. The symptom to the user is the same as the previous case with nova-compute. The VM launch process hangs at the 'spawning' state indefinitely. No ERROR level logs are generated as well. Applying the exemplary tool set, a similar pattern of logs from the OpenStack components was observed. One difference is that logs from the nova-scheduler are missing this time. Comparing with the normal run in FIG. 19C, note that the launch process progressed from the nova-api and up to the nova-conductor. The next expected logs are from the nova-scheduler, but are not present. This information indicates that further investigation of the nova-scheduler component is appropriate.

Figure 18:
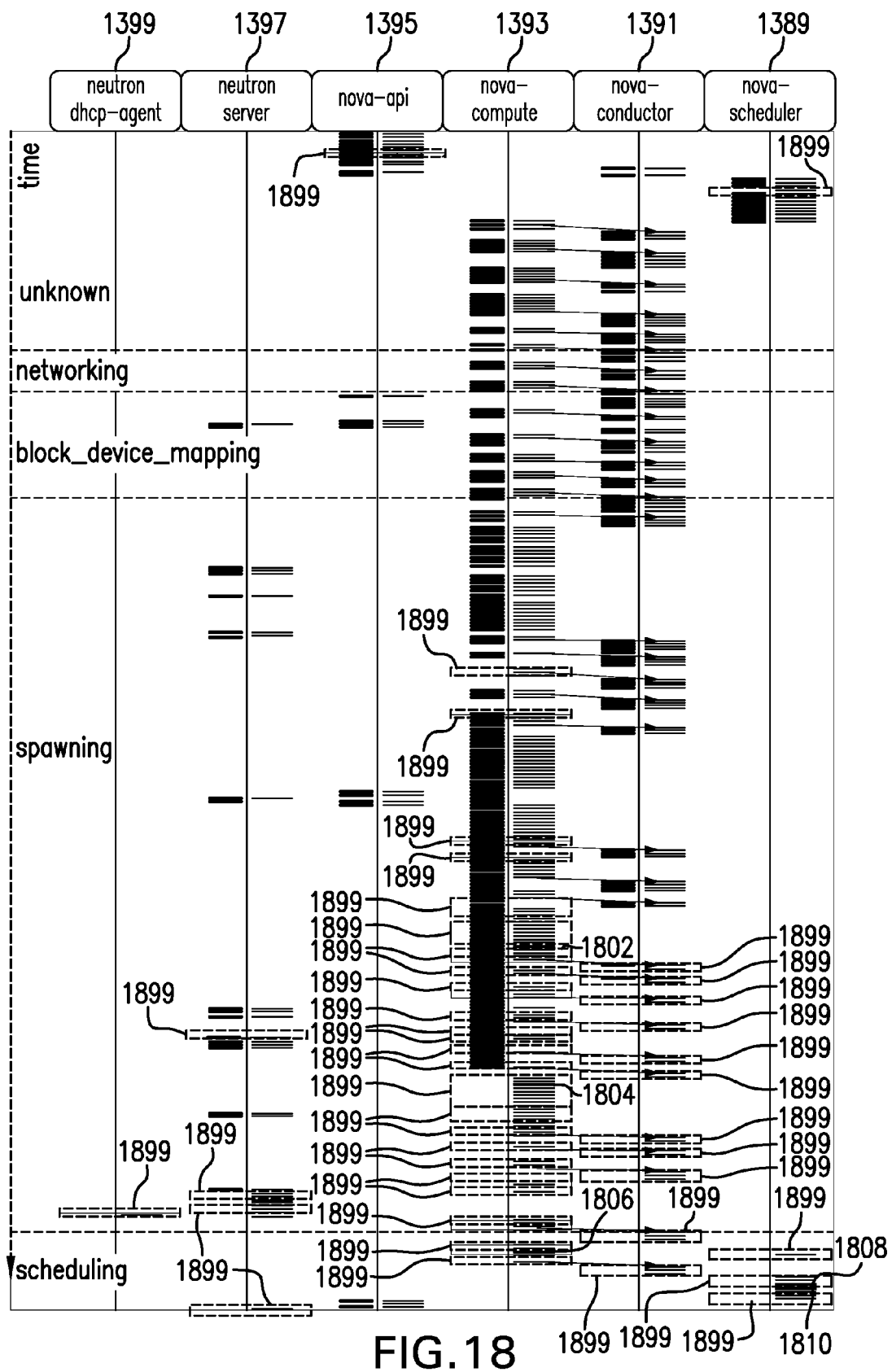
FIG. 18 shows a log plot for VM launch failure due to misconfiguration, which can be addressed using one or more embodiments of the present invention.

Misconfiguration Problem:

Failures from misconfiguration are one of the major factors that affect availability. This example illustrates the experimental application of the exemplary tool set to an actual misconfiguration problem. FIG. 18 shows a log plot for VM launch failure due to misconfiguration. The log plot of FIG. 18 shows the sequence of log events obtained while this problem occurred. A notable difference of this log data from previous cases is that the problem occurs towards the end of the VM launch process. The state transition (unknown, networking, block_device_mapping . . . ) is annotated on the left side. At the early part of the process, the logs match well with the reference model. However, many deviations start to be seen during the middle of the 'spawning' process. Some of the error logs are detected during this state and the processing continues into the 'scheduling' state where the failure is finally reported to the user. The error message shown to the web dashboard is depicted in FIG. 20; it is identical to the message received in the first problem case, shown in FIG. 14.

According to the exemplary tool set's log plot of FIG. 18, potential ERROR logs from nova-compute and nova-scheduler components are seen. Clicking each component name pops up an HTML table that compares the reference model log text and the current logs side by side. Going through the cells 1802, 1804, 1806, 1808, 1810 and cells outlined with dashed lines 1899, it becomes apparent that the highlighted text 2101 "internal error no supported architecture for os type 'hvm'" in FIG. 21 is probably the most useful information. FIG. 21 thus provides hints to the root cause of the problem in the log text. This hint does not immediately tell the operator that the problem is related to the configuration. However, using this in a web search directly leads to the solution, which is to add one line, "libvirt_type=qemu" to the nova.conf file.

In this specific case, since the hint text was included in the ERROR log, one might obtain the same result by grepping the raw log data and going through the ERROR logs. However, there are cases where the critical hint may lie in non-ERROR logs as shown in the previous case study. Also, using the exemplary tool set, operators can quickly gain additional insights such as how far the process progressed until it hit the error, which components were involved in the overall process, which components are normal and which ones faulty.

One or more embodiments thus provide an exemplary tool set, comprising a log analytics tool for problem diagnosis in a cloud platform. The goal of the exemplary tool set is to help operators save time during problem diagnosis by automatically analyzing large volume of logs and highlighting the high-value logs. In order to support this goal, one or more embodiments provide novel log correlation techniques, log comparison using templates and intuitive visualization modules. The exemplary tool set is able to provide diagnosis capability beyond common search based method.

Recapitulation

Given the discussion thus far, it will be appreciated that, in general terms, an exemplary method, according to an aspect of the invention, includes the step 420 of identifying, in a set of problem log entries from a computing system (cloud environment of FIGS. 1-3 is a non-limiting example), a subset of the set of problem log entries which pertain to a failed request. This step could be carried out, for example, with a log correlation module, embodied in a non-transitory computer readable medium, executing on at least one hardware processor such as 16. The log correlation module could include, for example, computer code implementing algorithm two of FIG. 8. A further step 422 includes comparing the subset to a reference model (e.g., in repository 402) which defines log entries per request type under a healthy state of the computing system. This comparison identifies a portion of the subset of problem log entries which deviate from corresponding log entries in the reference model (i.e., log entries in the reference model that would result from the request in a healthy state of the computing system). This step could be carried out, for example, with a log comparison module, embodied in the non-transitory computer readable medium, executing on the at least one hardware processor. The log comparison module could include, for example, computer code implementing algorithm three of FIG. 10.

A still further step 424 includes identifying, in the portion of the subset, at least one high-value log entry. This step could be carried out, for example, with a visualization module, embodied in the non-transitory computer readable medium, executing on the at least one hardware processor. The visualization module may include, for example, executable code generated from PYTHON source code and utilizing the Raphael JavaScript library to generate visualization aspects of FIGS. 6, 9, 12A-B, 13, 18, and 19A-C. An even further step includes outputting the at least one high-value log entry (e.g., via a graphical user interface of the visualization module).

In one or more embodiments, in the subset-identifying step, the computing system comprises a plurality of components (e.g., 602-606) distributed in a cloud environment such as shown in FIG. 1-3.

In one or more embodiments, the failed request has an associated identifier, and the identifying of the subset includes applying algorithm two of FIG. 8; e.g., identifying into a correlated set those entries of the set of problem log entries containing the associated identifier (lines 3-7); and adding to the correlated set additional entries of the set of problem log entries, based on a rule set, to obtain the subset (lines 9-19).

In some cases (see, e.g., FIG. 9 and accompanying text), the comparing comprises aligning individual lines of the subset with individual lines of the corresponding log entries in the reference model. Where any given log line cannot be matched, insert an opposing blank log entry (e.g., if can't match log line on left-hand side with one on right-hand side, insert blank on right-hand side, and vice-versa).

In some cases, the at least one high-value log entry is identified based, at least in part, on rareness of a corresponding log template.

In addition to using the reference model for problem diagnosis, one or more embodiments additionally or alternatively include building the reference model as shown generally at 404 in FIG. 4. This can be done, for example, by generating the rule set based on identifier name value pairs (see, e.g., algorithm one of FIGS. 7A and 7B); and applying the rule set in a log correlation process (see, e.g., algorithm two of FIG. 8) to obtain the log entries per request type under the healthy state of the computing system.

The skilled artisan will appreciate that in one or more embodiments, building the model includes application of algorithms one, two, and three, and thus may further include use of a log correlation rule generation module (computer code implementing algorithm one of FIGS. 7A and 7B).

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures; e.g.:

log correlation rule generation module including computer code implementing algorithm one of FIGS. 7A and 7B;

log correlation module including computer code implementing algorithm two of FIG. 8;

log comparison module including computer code implementing algorithm three of FIG. 10;

visualization model module including executable code generated from PYTHON source code and utilizing the Raphael JavaScript library to generate visualization aspects of FIGS. 6, 9, 12A-B, 13, 18, and 19A-C; and graphical user interface of the visualization module, discussed below.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface can be implemented, for example, via hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    identifying, in a set of problem log entries from a computing system, a subset of said set of problem log entries which pertain to a failed request;
    comparing said subset to a reference model which defines log entries per request type under a healthy state of said computing system, to identify a portion of said subset of problem log entries which deviate from corresponding log entries in said reference model;
    identifying, in said portion of said subset, at least one high-value log entry; and
    outputting said at least one high-value log entry.

2. The method of claim 1, wherein, in said subset-identifying step, said computing system comprises a plurality of components distributed in a cloud environment.

3. The method of claim 2, wherein:
    said failed request has an associated identifier;
    said identifying of said subset comprises:
        identifying into a correlated set those entries of said set of problem log entries containing said associated identifier; and
        adding to said correlated set additional entries of said set of problem log entries, based on a rule set, to obtain said subset.

4. The method of claim 3, wherein said comparing comprises aligning individual lines of said subset with individual lines of said corresponding log entries in said reference model, and, where any given line cannot be matched, inserting an opposing blank log entry.

5. The method of claim 4, wherein said identifying of said at least one high-value log entry is based on rareness of a corresponding log template.

6. The method of claim 5, further comprising building said reference model.

7. The method of claim 6, wherein said building of said reference model comprises:
    generating said rule set based on identifier name value pairs; and
    applying said rule set in a log correlation process to obtain said log entries per request type under said healthy state of said computing system.

8. The method of claim 1, wherein:
    said identifying of said subset is carried out with a log correlation module, embodied in a non-transitory computer readable medium, executing on at least one hardware processor;
    said comparing of said subset to said reference model is carried out with a log comparison module, embodied in said non-transitory computer readable medium, executing on said at least one hardware processor; and
    said identifying of said at least one high-value log entry is carried out with a visualization model module, embodied in said non-transitory computer readable medium, executing on said at least one hardware processor.

* * * * *